United States Patent [19]
Horvitz et al.

[11] Patent Number: 5,864,848
[45] Date of Patent: Jan. 26, 1999

[54] GOAL-DRIVEN INFORMATION INTERPRETATION AND EXTRACTION SYSTEM

[75] Inventors: Eric Horvitz, Kirkland; Erich S. Finkelstein, Bellevue, both of Wash.

[73] Assignee: Microsoft Corporation, Redmond, Wash.

[21] Appl. No.: 792,002

[22] Filed: Jan. 31, 1997

[51] Int. Cl.$^6$ ..................................................... G06F 17/00
[52] U.S. Cl. .......................... 707/6; 707/102; 707/514; 707/515; 707/516
[58] Field of Search ...................... 707/1–206, 500–542; 345/346–349; 600/300; 364/DIG. 1, DIG. 2; 711/152

[56] References Cited

U.S. PATENT DOCUMENTS

| | | | |
|---|---|---|---|
| 5,075,845 | 12/1991 | Lai et al. | 711/152 |
| 5,428,734 | 6/1995 | Haynes et al. | 345/349 |
| 5,594,638 | 1/1997 | Iliff | 705/3 |
| 5,660,176 | 8/1997 | Iliff | 600/300 |
| 5,711,297 | 1/1998 | Iliff | 600/300 |
| 5,724,968 | 3/1998 | Iliff | 600/300 |

OTHER PUBLICATIONS

"Intelligent Information–Sharing Systems," Malone et al., Computing Practices, vol. 30, No. 5, May 1987.

"Knowledge Based Documents Classification Supporting Integrated Document Handling," Eirund et al, ACM Conference on Office Information Systems, 1988.

"A Rule–Based Message Filtering System," Pollock, ACM Transactions on Office Information Systems, vol. 6, No. 3, Jul. 1988.

"Cooperative Work in the Andrew Message System," Borenstein et al., ACM Proc. Conference on Computer Supported Cooperative Work, 1988.

"Semi–Structured Messages are Surprisingly Useful for Computer–Supported Coordination," Malone et al., ACM Proc. Conference on Computer Supported Cooperative Work, 1988.

"Office–by–Example: An Integrated Office System and Database Manager," Whang et al., IBM Thomas J. Watson Research Center, ACM Transactions on Office Information Systems vol. 5, No. 4, pp. 393–427, Oct. 1987.

*Primary Examiner*—Wayne Amsbury
*Assistant Examiner*—David Yiuk Jung
*Attorney, Agent, or Firm*—Jones & Askew, LLP

[57] ABSTRACT

A proactive interface management system for ascertaining a computer user's goals and automatically extracting untagged data from one or more source objects and applying the data to one or more target objects. The proactive interface management system includes several cooperating program elements including a user interface, a decision engine, an extractor, and an applicator. These cooperating program elements automatically perform the steps of recognizing user gestures, ascertaining user goals, identifying relevant source information in one or more source objects, extracting the relevant source information, and applying the extracted information to one or more target objects.

23 Claims, 12 Drawing Sheets

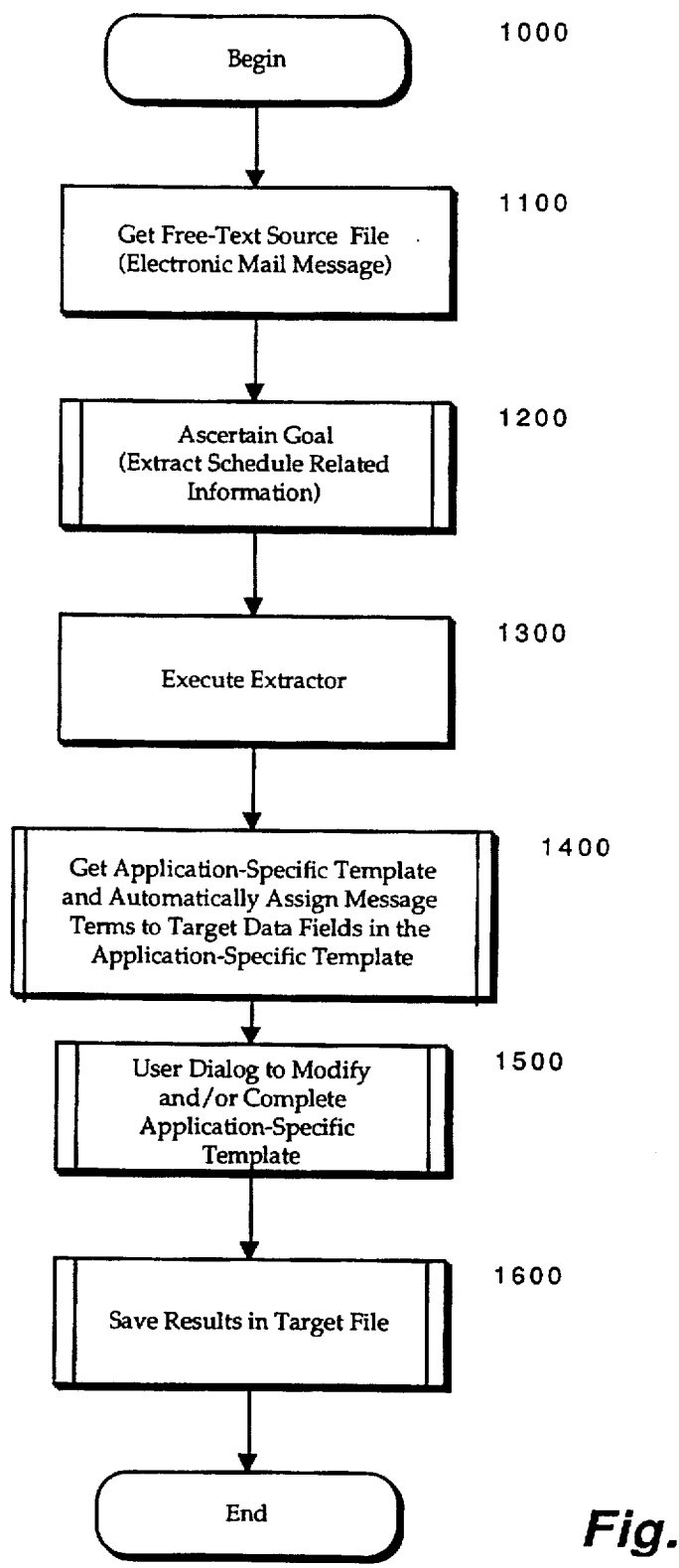

Automatically Assign Message Terms to Target Data Fields of
Application-Specific Template Automatically Assign Message Terms to Target Data Fields of Application-Specific Template User Dialog to Modify and/or Complete Frame Save Results

GOAL-DRIVEN INFORMATION INTERPRETATION AND EXTRACTION SYSTEM

TECHNICAL FIELD

The present invention relates to information handling systems and more particularly relates to a method and system for extracting goal-related information from a source object and storing the extracted information in a target object.

BACKGROUND OF THE INVENTION

There is a continuing need to develop user-friendly and powerful computer software. Causing the computer to automatically perform certain functions that previously required direct user interaction is one way in which software developers can make software programs easier and more convenient to use. For example, configuration programs have been developed that automatically set-up a user's computer workspace upon system start-up. These configuration programs launch certain applications and open certain files in accordance with a user profile so that the user does not have to go through the process of manually launching the applications and opening the files. Another example of an automatically-performed computer function is a word processing program that sets a new document to the user's preferred font, type size, and page layout when the document is initially opened. This saves the user from the process of manually setting these parameters within the new document.

The preceding examples of system and document initialization are relatively simple examples of proactive interface management. There are many other more complicated situations in which proactive interface management can be employed to save the user the time and frustration of having to perform certain steps manually. In these complicated situations, however, sophisticated logic may have to be employed to ascertain a user's goals and automatically take certain steps toward attaining those goals. For example, the process of extracting data from one file and inserting the data into another file through the usual "cut and paste" procedures can be tedious. A source program must be launched; a source file must be opened; the data to be extracted must be located and "cut"; a target program must be launched; a target file must be opened and the destination location identified; and finally the extracted data may be "pasted" into the destination location within the target file.

These data transfer procedures can become time consuming and tedious if performed repetitively. In particular, many users have a recurring goal of extracting schedule-related data from electronic mail (e-mail) or posted on Internet web page and storing the extracted data in an electronic calendar file. For this type of recurring data extraction task, it would be advantageous if the computer system could ascertain the user's goal from a few simple commands, and then automatically perform the "cut and paste" operation without further input from the user. Even if the computer system cannot automatically complete the entire "cut and paste" operation, it would be helpful if the computer system performed part of the task and then allowed the user to easily complete the remaining portion of the task, for example by confirming or altering actions suggested by the computer program. The specific situation of extracting schedule-related data from e-mail, and storing the extracted data in an electronic calendar program is described in more detail below.

Computer users are increasingly interconnecting their computers through networks, such as local area networks, wide area networks, ethernets, and the Internet. Interconnected computer users typically communicate with each other through e-mail, which is a real-time, paper-free, cost-effective mode of communication that has become a standard feature of virtually all computer networks. User-friendly, menu-driven e-mail application programs allow users to generate e-mail messages quickly and send them to large numbers of recipients. A recipient usually receives an e-mail message within seconds. A few simple key strokes or point-and-click operations allow the recipient to activate his or her e-mail application program and read the e-mail message. Specifically, an e-mail application program responds to these key strokes or point-and-click operations by storing the e-mail message in an e-mail file on the user's computer and displaying the e-mail message within an e-mail application window on the user's computer monitor.

Computer users in workplaces that rely on e-mail may spend a lot of time reading, writing, and handling e-mail messages. A convenient and efficient system for handling e-mail messages may be critical to the productivity of these workplaces. For example, a received e-mail message may contain schedule-related information, such as a meeting notice, seminar announcement, lunch date, or the like. A computer user may also rely on an electronic calendar program to organize a personal schedule. A computer user may therefore have a need to transfer schedule-related information from an e-mail message to an electronic calendar file. For example, a computer user may receive an e-mail message containing a notice of a meeting that the user wants to attend. Upon reading the e-mail message, the user may need to record a notation of the meeting in an electronic calendar file.

If the electronic calendar program is not resident in the computer system's memory, the user must first launch the calendar program and open a particular calendar file in order to transfer the schedule-related information from the e-mail file to the calendar file. Upon opening a particular calendar file, the electronic calendar program typically displays information from the calendar file within an electronic calendar application window on the user's computer monitor. Opening a calendar file thus causes the display of the e-mail application window to be replaced by the display of the electronic calendar application window. Once the calendar file has been open, the user typically must scroll to or otherwise locate the correct date in the calendar file so that the desired information from the calendar file is displayed within the electronic calendar application window. Once the information for the correct date is displayed within the electronic calendar application window, the user may have to refer back to the e-mail application window before entering a notation into the electronic calendar application window. Thus, the user may have to switch back and forth between the e-mail application window and the electronic calendar application window in order to correctly record the notation in the electronic calendar file. This process is slow, annoying, and presents the user with opportunities to make errors in transferring the information.

It would therefore be advantageous to have a system to facilitate transferring goal-related information from a source file, such as an e-mail file, to a target file, such as an electronic calendar file. It would be particularly advantageous if the system could automatically interpret the source file so that the correct information could be automatically extracted and stored in the target file with minimal user involvement. This task may be difficult if schedule-related information is to be extracted from an e-mail file because an e-mail file typically includes information written in free-text, such as prose. Interpreting free-text information is a cognitive function that is difficult to emulate with programmed logic.

More specifically, an e-mail message is typically displayed within a semi-structured e-mail application window that includes a structured area and an unstructured area. The structured area of the e-mail application window typically includes a number of fields for predefined information, such as fields for "to," "from," "cc," "subject," and "date." The unstructured area of the e-mail application window typically includes free-text information written in prose. Furthermore, schedule-related information is usually embedded within the free-text information included in the unstructured area of the e-mail application window. In some cases, however, the structured fields may also contain schedule-related information or information that is helpful in interpreting certain free-text terms included in the unstructured area of the e-mail application window.

The meaning of a particular message term in an e-mail file may therefore depend on the meaning of other terms within the e-mail file. Indeed, the meaning of a particular e-mail message term may depend on the context of the free-text portion of the message as a whole. Similarly, the meaning of message terms may vary from user to user depending on the lexicon used by authors of messages. Prior information handling systems do not handle the tasks of interpreting free-text information or adapting to a specialized lexicon very well. There is therefore a need for an improved method and system for interpreting source files, such as e-mail files, that contain free-text information. It would be advantageous for the improved method and system to include an adaptive lexicon, in which the logic used to interpret free-text information may be tailored in response to source files previously interpreted for a particular user.

The needs identified above are described in the context of a system in which the goal is extracting schedule-related information from an e-mail file and storing the extracted information in an electronic calendar file. A similar need exists, however, for many different goals for which information may be extracted from a free-text source file and stored in a predefined format in a target file. For example, a sales manager may have a need to extract sales statistics from free-text sales reports and store them in a database. Similarly, a researcher may have a need to extract information related to a particular research topic from free-text files within an electronic library, such as "LEXIS," and store the extracted information in a specialized format.

Generally stated, there is a need for an improved method for ascertaining a user's goals and automatically taking certain steps toward attaining those goals. Specifically, there is a need for a proactive interface management system that, in recognition of user goals, automatically identifies and extracts relevant source information from one or more source objects for application to one or more target objects.

More specifically, there is a need for an improved method and system for interpreting a source file containing free-text information, identifying goal-related terms, and extracting the goal-related terms for storage in a target file in a predefined format. There is also a need for ensuring that the source file has been properly interpreted prior to recording the extracted information in the target file. There is also a need for an information interpretation and extraction system with an adaptive lexicon, in which the logic used to interpret free-text information is tailored in response to source files previously interpreted for a particular user.

SUMMARY OF THE INVENTION

The present invention is a method and system for ascertaining a computer user's goals and automatically taking certain steps toward attaining those goals. A proactive interface management system according to the present invention allows data to be extracted from one or more source objects and applied to one or more target objects. The proactive interface management system includes several cooperating program elements including a user interface, a decision engine, an extractor, and an applicator. These cooperating program elements automatically perform the steps of recognizing user gestures, ascertaining user goals, identifying relevant source information in one or more source objects, extracting the relevant source information, and applying the extracted information to one or more target objects.

According to an aspect of the present invention, a user goal is ascertained by inferring a user goal based on a predefined system context and a pattern of user commands received during a current user interface session. If the likelihood of the goal inferred does not exceed a threshold, then confirmation of an action may be requested of the user or the user may be presented with a list of alternative actions for selection.

Once the goal has been selected, the extractor of the present invention implements interpretation and extraction logic that extracts the desired information from the source object, including untagged portions of the source object, for inclusion in the target object. In order to implement the selected goal, the present invention uses one or more templates to interpret information within and to extract information from the source object. Each template that extracts information from untagged portions of a source file includes a lists of expected data patterns organized under a system of tokens. Each token is tied to one or more target object fields in an application-specific template. Relevant data patterns in the source object are identified by comparing source object data patterns to the expected data patterns included in the template.

The application-specific template containing the set of target object fields is displayed to the user for review and modification. The user may quickly complete and/or correct the target object fields and apply the completed and/or corrected data to the target object. The lexicon of the template used to generate the set of target object fields for application to the target object may be updated with the completed and/or corrected information input by the user. This allows the lexicon of the application-specific template to be updated with information learned from manual user input.

In view of the foregoing, it will be appreciated that the present invention provides an improved method and system for interpreting a source object containing untagged information, identifying goal-related information, and extracting the goal-related information for application to a target object. That the present invention improves over the drawbacks of the prior art and provides the advantages described herein will become apparent from the following detailed description of the disclosed embodiments and the appended claims.

BRIEF DESCRIPTION OF THE DRAWINGS

FIG. 6, comprising

FIG. 7 is a logic flow diagram showing the steps of a computer-implemented process for an illustrative embodiment of a goal-driven information interpretation and extraction system, the electronic mail auto scheduler.

DETAILED DESCRIPTION

The present invention is directed toward a proactive interface management system that makes complex data search and extraction tasks easier to perform. In one embodiment, the invention provides an "autoscheduler" that extracts schedule related information from e-mail messages and applies the extracted information to electronic calendar files.

The following detailed description is presented largely in terms of processes and symbolic relationships of operations of data bits manipulated by a processing unit and maintained within data structures supplied by one or more memory storage devices. These data structures impose a physical organization on the collection of data bits stored within computer memory and represent specific electrical or magnetic elements. These descriptions and symbolic representations are the means used by those skilled in the art of computer programming and computer construction to most efficiently convey teachings and discoveries to others skilled in the art.

For the purpose of this discussion, a method or process is generally conceived to be a sequence of computer-executed steps leading to a desired result. These machine-implemented steps, which may constitute a program module, generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, values, elements, symbols, characters, terms, numbers, records, files, or the like. It should be kept in mind, however, that these and similar terms should be associated with appropriate physicals quantities for computer operations, and that these terms are merely conventional labels applied to these physical quantities that exist within the computer.

In addition, it should be understood that the programs, processes, methods, etc., described herein are not related or limited to any particular computer, single chip processor, or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Exemplary Operating Environment

Figure 1:
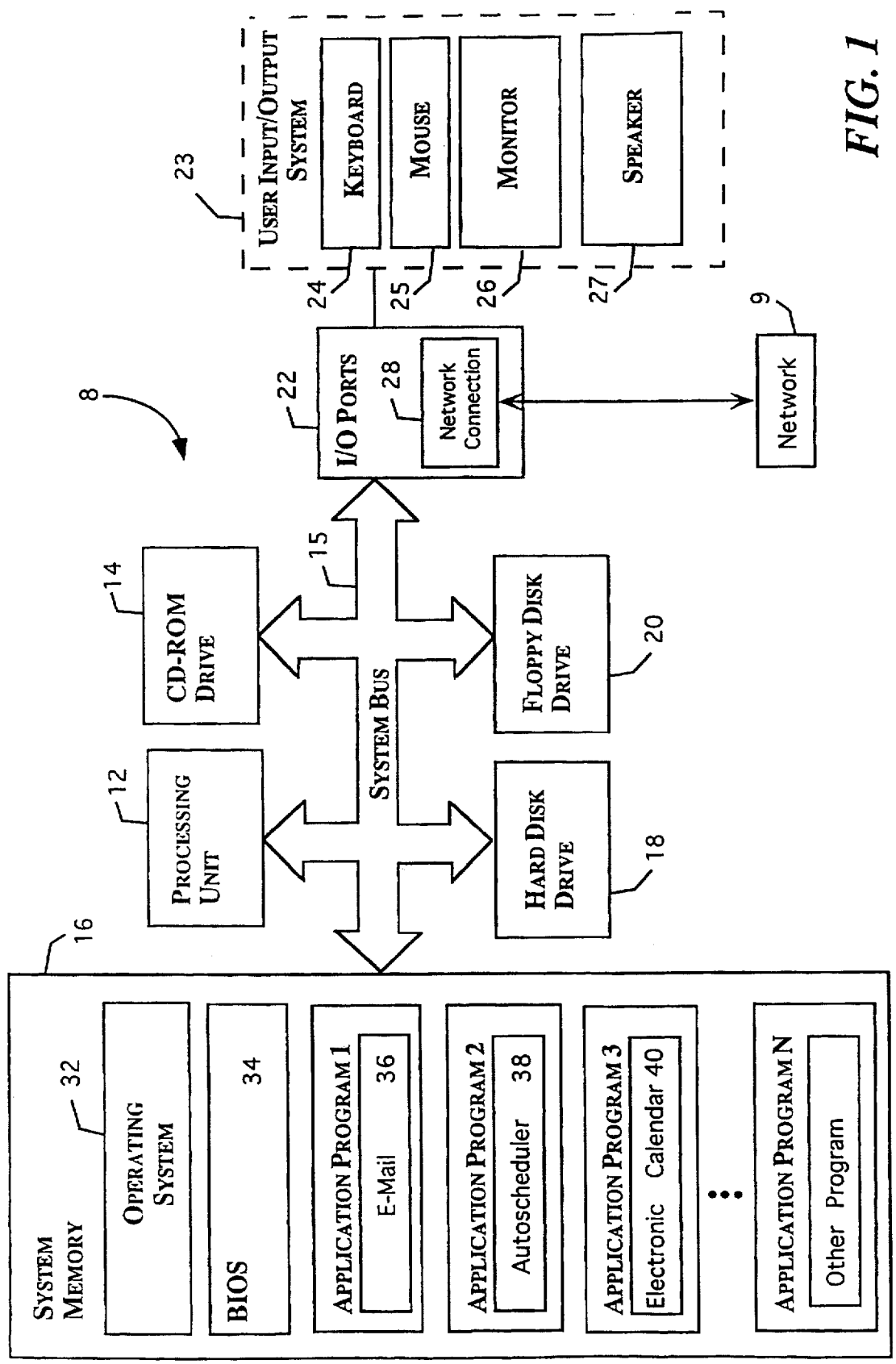
FIG. 1 is a functional block diagram of a personal computer system interconnected with a network.

Turning now to the drawings, in which like numerals indicate like elements throughout the several figures, FIG. 1 shows an operating environment for the present invention including a computer system 8 connected to a network 9. The computer system 8 may be any of a variety of conventional personal computer or similar work stations, including but not limited to "APPLE," "IBM," or "IBM"-compatible personal computers including those known as "AT" or "PS/2" compatibles. The network 9 may be any of a variety of compatible network configurations, including but not limited to a local area network (LAN), wide area network (WAN), ethernet, the Internet, or the like. The network 9 interconnects the computer system 8 with one or more other computer systems and may interconnect the computer system 8 with one or more peripheral devices, such as printers, modems, data servers, etc. The computer system 8 and the other computer systems interconnected with the computer system 8 by way of the network 9 communicate with each other using electronic mail (e-mail). The functions and operations of conventional e-mail are well known and will not be further described herein.

The computer system 8 includes a processing unit 12 interconnected by way of a system bus 15 with a system random access memory (RAM) 16 and internal I/O devices including a CD-ROM drive 14, a hard disk drive 18, and a floppy disk drive 20. The drives and their associated computer-readable media provide nonvolatile storage of computer readable instructions, data structures, program components and other data for the computer system 8. Although the exemplary environment described herein employs a hard disk, a removable floppy disk and a removable CR-ROM disk, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment. The system bus 15 also interconnects the processing unit 12 with one or more I/O ports 22. The processing unit 12 is typically implemented as a microprocessor, such as the 80386, 80486, or the various "PENTIUM" models manufactured by Intel Corporation, Santa Clara, Calif. The I/O ports 22 are used to interconnect the computer system 8 with a conventional user input/output system 23 including a keyboard 24, a mouse 25, a monitor 26, and a speaker 27. The I/O ports 22 are also used to interconnect the computer system 8 with a network connection port 28. The network connection port 28 is used to interconnect the computer system 8 with other computers and peripheral devices via the network 9.

The system memory 16 includes an operating system 32, such as "WINDOWS 95" manufactured by Microsoft Corporation, Redmond, Wash. The operating system 32 comprises a set of computer program instructions that control the internal functions of the computer system 8 and thereby allow the computer system 8 to run application software and other program modules. The operating system 32 is typically installed in a mass storage device, such as the CD-ROM 14, the hard disk drive 18, the floppy disk drive 20, or a ROM chip (not shown). During boot up (initialization) of the computer system 8, the operating system 32 is loaded into the system memory 16.

During operation of the computer system 8, application programs operate in conjunction with operating system 32 to perform specialized functions. Common application programs include word processors, spread sheets, databases, games, etc. In performing these specialized functions, the application programs send information to the operating system 32, from which the operating system creates application windows for visual presentation to a user on the monitor 26.

Certain executable program modules associated with an application program must be loaded into the system memory 16 before the application program can run on the computer system 8. Launching an application program includes loading the executable program modules necessary to run the application program into the system memory 16 of the computer system 8. The application programs are typically stored in a mass storage device, such as the CD-ROM drive 14, the hard disk drive 18, or the floppy disk drive 20 until a user initially launches the application program after booting up the computer system 8. Several application programs may be simultaneously loaded into the system memory 16 of the computer system 8. A user may then switch quickly among the various application programs. A user typically selects a particular application program for execution by positioning a pointer on an icon or window associated with the application program and clicking a mouse button. For example, a user typically launches the e-mail program 36 upon boot up so that the user can quickly activate the e-mail program 36 by clicking on an icon, menu item, or window anytime throughout the day. Typically, a visual cue or an audible sound may be activated whenever a new e-mail message arrives to alert the user that a new message is waiting in his or her mailbox. This makes using the e-mail program 36 convenient throughout the day.

The present invention is a method and system for extracting goal-related information from a source object that includes untagged information and storing the extracted information in a target object. The source object may be a file. The target object is typically a special purpose file for handling information of the type extracted from the source file. A goal in this context is the identification and extraction of information pertaining to a predefined subject. A source file is an electronic file including untagged information, such as free-text information, which may have been created with a word processor or scanner. A target file is an electronic file for handling extracted information in a predefined manner, such as an electronic database or other special purpose information handling file. For example, a disclosed embodiment of the present invention referred to herein as an "autoscheduler" provides a method and system for identifying and extracting schedule-related information (the goal) from an e-mail file (the source file) and storing the extracted information in a personal calendar file (the target file). The autoscheduler program 38 facilitates the handling of schedule-related information received via e-mail.

When an e-mail message contains schedule-related information, such as information pertaining to a meeting that the user would like to attend, the user may have a need to record information from the e-mail file in another electronic file, such as a personal calendar file. Similarly, a user may wish to extract other types of information from e-mail files for storage in other electronic files. For example, a sales manager may receive e-mail messages including sales reports from sales associates. The sales manager may wish to extract sales statistics from these sales reports and store them in a database. It is further noted that the source file containing untagged information such as a free-text message need not be an e-mail message. The principles of the present invention may be applied to any type of electronic source file that contains untagged information. For example, the present invention could be used to search electronic information systems, such as "LEXIS" or other generally available electronic information sources to extract address information for storing in a database. Furthermore, those skilled in the computer programming arts will appreciate that autoscheduler program 38 described herein may be modified to perform information interpretation and extraction for other goals.

In connection with the disclosed autoscheduler embodiment of the present invention, a first application program running on the computer system 8 is an e-mail program 36, which allows the computer system 8 to receive and send e-mail messages from or to other computer systems on the network 9. A second application program running on the computer system 8 is a specialized autoscheduler program 38. The autoscheduler program 38 is described with more particularity with respect to FIGS. 3–11. A third application program running on the computer system 8 is a conventional electronic calendar program 40. The e-mail program 36, the autoscheduler program 38, and the electronic calendar program 40 may all be simultaneously stored in system memory 16 for convenient access by the user.

DESCRIPTION OF THE DISCLOSED EMBODIMENTS

Figure 2:
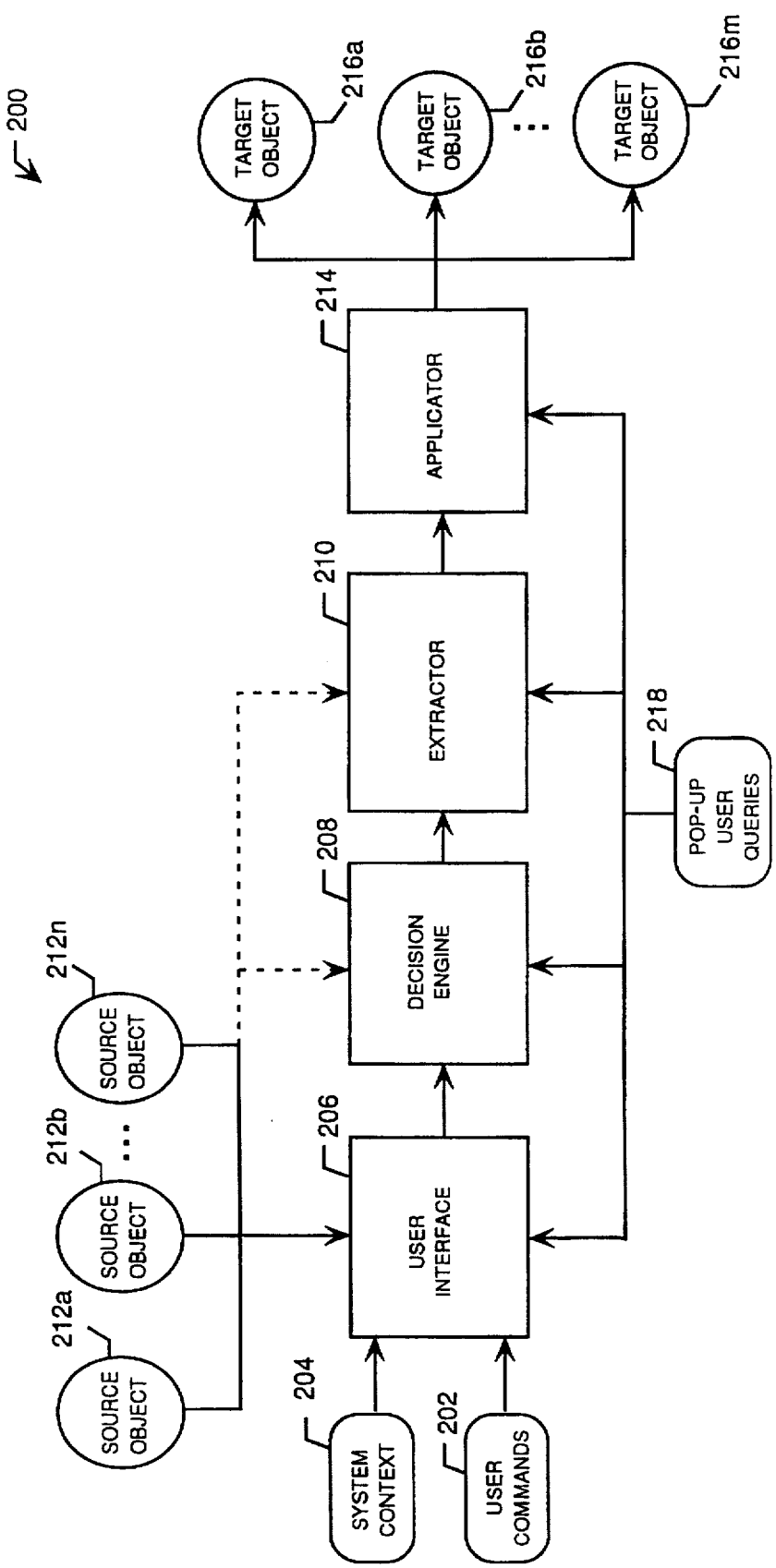
FIG. 2 is a diagram illustrating the software architecture of a proactive interface management system according to the present invention.

FIG. 2 is a diagram illustrating the software architecture of a proactive interface management system 200 according to the present invention. Generally stated, the proactive interface management system 200 monitors the user commands 202 and the system context 204 to make complex data search and extraction tasks easier to perform. The user commands 202 include all of the conventional commands that a user may communicate using the user input/output system 23. The system context 204 includes the configuration computer system 8, as well as the current state of the various hardware and software elements within the computer system 8. For example, the system context 204 includes status information regarding the program modules that are loaded in the system memory 25, the extensions that are active, the servers that are accessible to the system, the program modules that are available via the servers, etc.

The proactive interface management system 200 preferably includes four cooperating computer software components( which may be implemented as separate objects in an object-oriented software environment): a user interface 206, a decision engine 208, an extractor 210, and an applicator 214. These elements allow data to be extracted from one or more source objects 212a–212n and applied to one or more target objects 216a–216m. Each element performs certain functions and interacts with other elements through predefined object-oriented interfaces, as described below. Those skilled in the art will appreciate the division of functions among these software elements, and the interfaces between these elements, may be altered somewhat within the scope of the present invention. For example, a function could be reassigned from one element to another, two or more of these elements could be combined into a single element, a single element could be divided into two or more cooperating elements, etc. In the disclosed autoscheduler embodiment of the present invention, the autoscheduler program contains the functionality of all four of these components.

The proactive interface management system 200 causes the computer system 8 to perform sophisticated data extraction tasks automatically or with a minimum amount of user interaction. Pop-up windows 218 are preferably employed for user interaction at important points in the data extraction process. The use of pop-up windows allows the proactive interface management system 200 to query the user for specific information, and to confirm instructions, with a minimum of user action. This allows the user's interaction to be focused on narrow instructions in short intervals.

High-level user interface commands are precursors to the proactive interface management system 200. For example, as an extension of the common notion of "drag and drop" implemented in many PC operating systems, an icon representing a source object may be selected, dragged across the computer screen, and dropped on another icon representing a target object. A goal is inferred based upon the object types involved in this "drag and drop" combination to perform a simple data extraction task that the computer system 8 performs automatically in response to a "drag and drop" user gesture. The proactive interface management system 200 extends the conventional "drag and drop" operation to provide a sophisticated and dynamic set of data extraction tasks that can be performed by the computer system 8 in response to relatively simple user gestures.

The data extraction tasks performed by the proactive interface management system 200 differ from a conventional "drag and drop" operation in that the decision engine 208 allows the user's goal–to extract a particular type of data from one or more source objects and store the extracted data in one or more target objects—to be ascertained in a wide variety of ways. In addition, the extracted data can be maintained in a wide variety of formats such as free-text, pictorial bit maps, video, sound, etc. Moreover, the extractor 210 may interpret the data within one or more source objects, identify a relevant portion of the data, and extract only the relevant portion of the data for storage in one or more target objects. As noted previously, the proactive interface management system 200 may use a pop-up window at virtually any point in the data extraction process to gain additional information from the user, or to confirm a proposed course of action.

The user interface 206 performs the function of recognizing user gestures that indicate data extraction tasks. A user gesture may be any type of explicit command that associates one or more objects with a data extraction command, such as a conventional "drag and drop" gesture. Another type of explicit user gesture might involve "focusing" on one or more objects, such as a source object and a target object, and then clicking on a menu item or entering a predefined command sequence. Alternatively, a selection window may be displayed on the monitor 26 that allows the user to enter or select one or more source files, one or more target files, and one or more data extraction commands.

Those skilled in the art will appreciate that many other types of explicit commands may be recognized from the user input-output system 23.

In addition, the user interface 206 may be programmed to recognize certain implicit user gestures. For example, the user interface 206 may be selectively programmed to recognize an implicit user gesture whenever the user downloads a file that contains a sound component. That is, the user interface 206 may automatically interpret the downloading of a file including a sound component as a command to extract the sound component from the file for storage in a target file, such as the user's library of sound files. This type of implicit gesture may be useful for searching a distributed information source, such as the Internet, for files including sound components, downloading files, and extracting the sound components to build an archive of sound files. A similar search-and-extract operation could be performed for pictorial bit-maps, video data, music, text files containing certain terms defined in a Boolean search command, etc.

A user gesture indicating a data extraction command typically defines one or more source objects and/or one or more target objects. It will be understood that the recognition of a user gesture indicating a data extraction command initiates a sophisticated data analysis and extraction process. Therefore, a pop-up user window is typically utilized to query the user to confirm a detected gesture before the user interface 206 proceeds. The pop-up user window may also be utilized to query the user to provide additional information related to the data extraction command, such as the definition of the one or more source objects, one or more target objects, and/or one or more data extraction commands.

The user interface 206 is preferably implemented as a dynamic link library (DLL) that may be invoked either by the shell of the operating system or by an application program that is manipulating a particular source file. The user interface 206 monitors the user commands 202 and recognizes certain user gestures, as described above. Upon recognizing a user gesture, the user interface 206 calls the decision engine 208, which further processes the user's command. Like the user interface 206, the decision engine 208 is preferably implemented as a DLL.

The decision engine 208 may use a wide variety of decision-making techniques to ascertain the user's goal. For example, the decision engine 208 may respond to explicit pre-defined user commands, such as command key sequences or combinations. Alternatively, the decision engine 208 may utilize one or more complex decision-making techniques such as a Bayesian inference network or a deterministic rule-based algorithm. In addition, a pop-up user window may be utilized to query the user to provide additional information for the decision-making process, or to confirm a goal proposed by the decision engine 208. A pop-up user window may also be used to confirm an inferred goal before the decision engine 208 proceeds. Once the user's goal has been ascertained, the decision engine 208 calls the extractor 210, and typically passes the extractor 210 a pointer to one or more source objects and/or one or more target objects.

The extractor 210 may use a wide variety of techniques to identify special attributes within the source information. For example, extractor 210 may identify bit maps if the user's goal involves extracting bit maps, or sound elements if the user's goal involves extracting sound elements, or words or symbols pertaining to a particular topic if the user's goal involves extracting text related to that topic, etc. For free-text portions of text files, a Boolean instruction may be used to identify text patterns or combinations. Alternatively, a template of relevant terms may be used to identify free-text sections of source objects that likely pertain to a particular subject.

The extractor 210 may also determine which portions of the source information are relevant to the user's goal. Some of the extracted information may be parsed from structured fields of a source object, such as the sender name and subject fields of a source e-mail message. But other information may have to be extracted from the untagged portion of the source object or from other objects that are linked or attached to the source object. This step may involve any of a wide variety of sophisticated techniques for identifying relevant data within the source objects. For a user goal of extracting bit maps pertaining to a particular type, correlations, projection histograms, Hough transformations, and other image analysis techniques may be used to determine whether the source files include bit maps containing the desired types of images. For a user goal of extracting music, cadence analyses may be performed to determine whether the source files include sound elements containing music.

One of the more challenging tasks involves the interpretation of free-text portions of source objects. Interpreting free-text information may involve the use of one or more predefined templates of terms that are relevant to the user's goal. The extractor 210 typically applies such a template to the source object to tag candidate terms that are most likely relevant to the user's goal. The candidate terms are then prioritized in descending order of likelihood for extraction or presentation to the user. For example, the candidate terms may be grouped into clusters based on their spatial relationship to each other using a Bayesian, single linkage, complete linkage, or other type of clustering technique. Alternatively, certain terms of the template may be pre-ranked in descending order of likelihood prior to clustering. The candidate terms may then be grouped into clusters based on their spatial relationship to the highest priority pre-ranked terms that are tagged in the source object. In addition, each goal may have an associated set of rules that are used in the prioritizing process, such as terms that are only tagged if they appear in certain phrases, terms that are assigned a higher probability if they appear following a date term, terms that are automatically replaced by synonyms, etc. Many other types of cluster and ranking techniques may be used to interpret free-text information in connection with the disclosed embodiments.

An illustrative embodiment of interpreting free-text is described below in the context of an "autoscheduler" that extracts schedule related information from e-mail messages. That is, the principles of the present invention may be used to construct an autoscheduler for extracting schedule-related information (the goal) from an e-mail file (the source object) and storing the extracted information in an electronic calendar file (the target object). For this application, the autoscheduler's application-specific template includes a "date" target field for identifying the date of a meeting, a "time" target field for identifying the starting and ending times of the meeting, a "place" target field for identifying the location of the meeting, and an "attendees" target field for identifying the meeting attendees. The information assigned to the target fields of the autoscheduler template may be saved to create an entry in the target calendar file.

Expected terms (i.e., schedule-related terms) within the e-mail file are tagged and assigned to target fields of the autoscheduler's application-specific template. The target fields of the autoscheduler template correspond to target fields within the electronic calendar file. For example, the autoscheduler may use the template to tag the terms "today," "tomorrow," "next Friday," etc. with the token "day word." The "day word" token corresponds to the "date" target field in the electronic calendar file under which the extracted information will ultimately be stored. The extractor includes an application-specific rule base with each application-specific template. Each rule base is a system of rules for interpreting message terms and assigning the message terms to target fields in the application-specific template. For example, the rule base may include rules for interpreting the meaning of message terms based on hints, such as punctuation and the relative position of terms in a message.

Once the candidate terms are identified by tagging, then they are prioritized in descending order of likelihood for extraction or presentation to the user. In the illustrative embodiment of the autoscheduler, the candidate terms are ranked through a two step process of first grouped them into clusters to build sets of candidate fields. Then the clusters are ranked in priority order. A tagged term is grouped into a cluster based on its spatial relationship to other tagged terms in the source file. For example, all tagged terms that are within four source file terms of another tagged term may be grouped into the same cluster. As stated above, once the candidate terms have been grouped in clusters, the clusters are ranked. It has been discovered that clusters that contain more relevant terms are generally more likely to include important information, and that clusters in which the relevant terms are more tightly grouped are generally more likely to include important information. The preferred method for ranking the clusters therefore assigns a higher priority to clusters that contain a higher number of expected terms. The preferred ranking method also assigns and a higher priority to clusters that include terms that are closer together. More specifically, the following formula may be used to rank clusters:

$$\text{cluster value} = \sum_{1}^{k-1} \frac{|a_i - a_{i+1}|}{k^2}$$

where k is the number of relevant terms in the cluster and $a_i$ is the number of source file terms from the relevant term(i) to the beginning of the source file. The exponent "2" may be varied.

The highest ranking tagged terms are then inserted into structured fields of a target file. For the autoscheduler application, the target fields typically include "date of appointment" (e.g., day, month, year), "start time of appointment," "end time of appointment," "location of appointment," "subject of appointment," and "source of schedule information." For an address extraction application, the target file may include structured fields such as "name," "title," "street address 1," "street address 2," "city/town," "state, country," "telephone number," "fax number," "e-mail address," and "web home page." It will be appreciated that many other types of target files may be designed corresponding to different extraction goals.

Because the data analysis performed by the extractor 210 typically requires a substantial allocation of computer resources, a pop-up user window is typically utilized to query the user to confirm a proposed analysis before the extractor 210 proceeds. The pop-up user window may also be used to further define the data extraction task, and to add or subtract from the list of source objects and target objects on which the extractor 210 will operate.

Once the relevant data has been identified, the extractor 210 calls the applicator 214 to apply the extracted data to the target objects. Like the extractor 210, the applicator 214 may be implemented as a DLL. Similar to the extractor 210, the applicator 214 may use a pop-up window to gain additional information from the user or to confirm a proposed data extraction task before proceeding.

It will be appreciated that the proactive interface management system 200 may be used to facilitate many different types of data search and extraction tasks. For example, bit maps may be extracted from source files on the Internet and stored in the user's library of bit maps. Similarly, music elements may be extracted from source files on the Internet and stored in the user's library of music files. Free-text pertaining to a particular topic may be extracted from source files on the Internet and stored in a target file on the user's computer system 8 for further review and analysis by the user at a later time. It will be appreciated that many other data extraction tasks may be performed by the proactive interface management system 200. Indeed, the power of the searching and data extraction engine provided by the proactive interface management system 200 is limited only by the skill of the programmer in defining the above-described tools for the user, and the user's skill in applying these tools.

Figure 3:
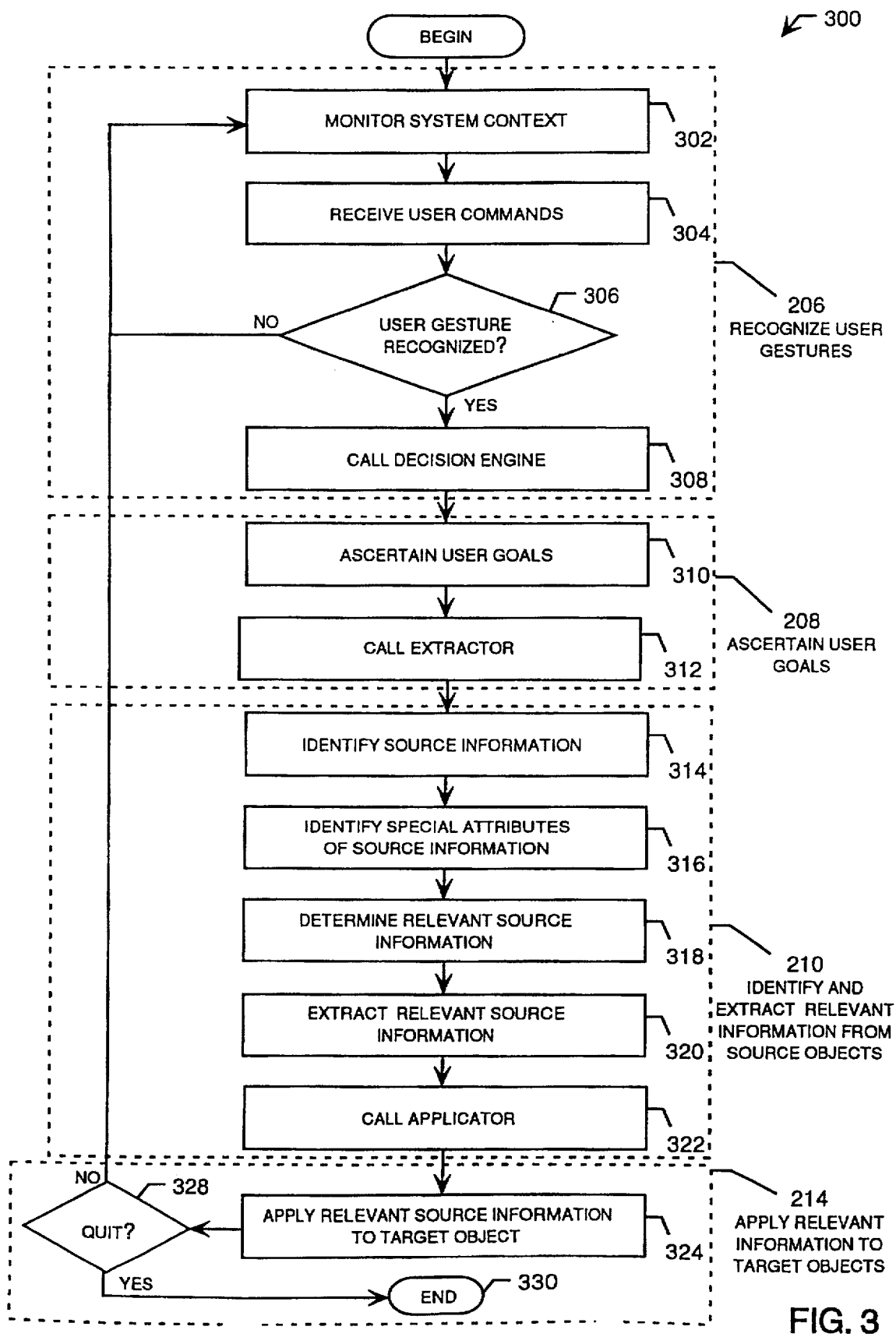
FIG. 3 is a logic flow diagram illustrating the operation of a proactive interface management system according to the present invention.

FIG. 3 is a logic flow diagram illustrating a computer-implemented process 300 for the proactive interface management system 200 according to the present invention. In step 302, the user interface 206 monitors the system context. In step 304, the user interface 206 receives user commands and, in decision step 306, the user interface 206 determines whether a user gesture indicating a data extraction command is recognized.

If a user gesture indicating a data extraction command is not recognized, the "no" branch is followed from step 306 back to step 302, in which the user interface 206 monitors the system context. If a user gesture indicating a data extraction command is recognized, the "yes" branch is followed from step 306 to step 308, in which the user interface 206 calls the decision engine 208. In step 310, the decision engine 208 ascertains the user's goal for the data extraction command. In step 312, once the decision engine 208 has ascertained the user's goal, it calls the extractor 210.

In step 314, the extractor 210 identifies the source information within the source objects, and in step 316 the extractor 210 identifies special attributes within the source information. In step 318, the extractor 210 determines which portions of the source information are relevant to the user's goal. Once the relevant data has been identified, the extractor 210 extracts the relevant source information in step 320. In step 322, the extractor 210 calls the applicator 214, and typically passes the applicator 214 a pointer to the extracted data and one or more target objects. In step 324, the applicator 214 applies the extracted data to the target objects. Alternatively, the extractor 210 may skip step 320 and pass the applicator 214 a pointer to the relevant portions of one or more source objects and/or one or more target objects. In this case, in step 324, the applicator 210 extracts the relevant portions of the source objects and applies the extracted data to the target objects.

Step 324 is followed by decision step 328, in which it is determined whether the user has indicated that the proactive interface management system 200 should quit upon completing the data extraction task. If the proactive interface management system 200 has been instructed to quit, the "yes" branch is followed to the "end" step 330, and the computer-implemented process illustrated by FIG. 3 is completed. If, on the other hand, the proactive interface management system 200 has not been instructed to quit, the "no" branch is followed to step 302, and the computer-implemented process illustrated by FIG. 3 repeats.

In view of the foregoing, it will be appreciated that the proactive interface management system 200 may be used to facilitate many different types of data search and extraction tasks. Those skilled in the art will appreciate that searching and data extraction techniques appropriate to any particular task may be identified and made available to a user using the proactive interface management system 200. One specific example of the proactive interface management system 200 that may be defined using the above-described technology is an "autoscheduler" that extracts schedule related information from e-mail messages. This particular example is particularly instructive because it teaches an illustrative method for addressing the challenging task of interpreting free-text data in source objects. From this example, those skilled in the art will appreciate that powerful extractors may be defined for myriad other goals that may be defined by a user.

Autoscheduler—An Illustrative Embodiment

As noted above, the proactive interface management system 200 described above may provide a method and system for extracting goal-related information from a source object, for this embodiment a source file, that includes free-text information. The extracted data may then be stored in a particular target object, for this embodiment a target file, such as a special purpose file for handling information of the type extracted from the source file. A goal in this context is the identification and extraction of information pertaining to a predefined subject. A source file is an electronic file including untagged information, such as free-text, which may commonly be created with a word processor or scanner. A target file is an electronic file for handling extracted information in a predefined manner, such as an electronic database or other special purpose information handling file. For example, an illustrative embodiment of the present invention referred to herein as an "autoscheduler" provides a method and system for identifying and extracting schedule-related information (the goal) from an e-mail file (the source file) and storing the extracted information in a personal calendar file (the target file). The autoscheduler program 38 facilitates the handling of schedule-related information received via e-mail.

When an e-mail message contains schedule-related information, such as information pertaining to a meeting that the user would like to attend, the user may have a need to record information from the e-mail file in another electronic file, such as a personal calendar file. Similarly, a user may wish to extract other types of information from e-mail files for storage in other electronic files. For example, a sales manager may receive e-mail messages including sales reports from sales associates. The sales manager may wish to extract sales statistics from these sales reports and store them in a database. It is further noted that the source object containing untagged information need not be an e-mail message. The principles of the present invention may be applied to any type of electronic source file containing untagged information. For example, the present invention could be used to search electronic information systems, such as "LEXIS" or other generally available electronic information sources to extract address information for storing in a database. Furthermore, those skilled in the computer programming arts will appreciate that autoscheduler program 38 described herein may be modified to perform information interpretation and extraction for other goals.

In connection with the disclosed autoscheduler embodiment of the present invention, a first application program running on the computer system 8 is an e-mail program 36, which allows the computer system 8 to receive and send e-mail messages from or to other computer systems on the network 9. A second application program running on the computer system 8 is a specialized autoscheduler program 38. The autoscheduler program 38 is described with more particularity with respect to FIGS. 5–13. A third application program running on the computer system 8 is a conventional electronic calendar program 40. The e-mail program 36, the autoscheduler program 38, and the electronic calendar program 40 may all be simultaneously stored in system memory 16 for convenient access by the user.

Figure 4:
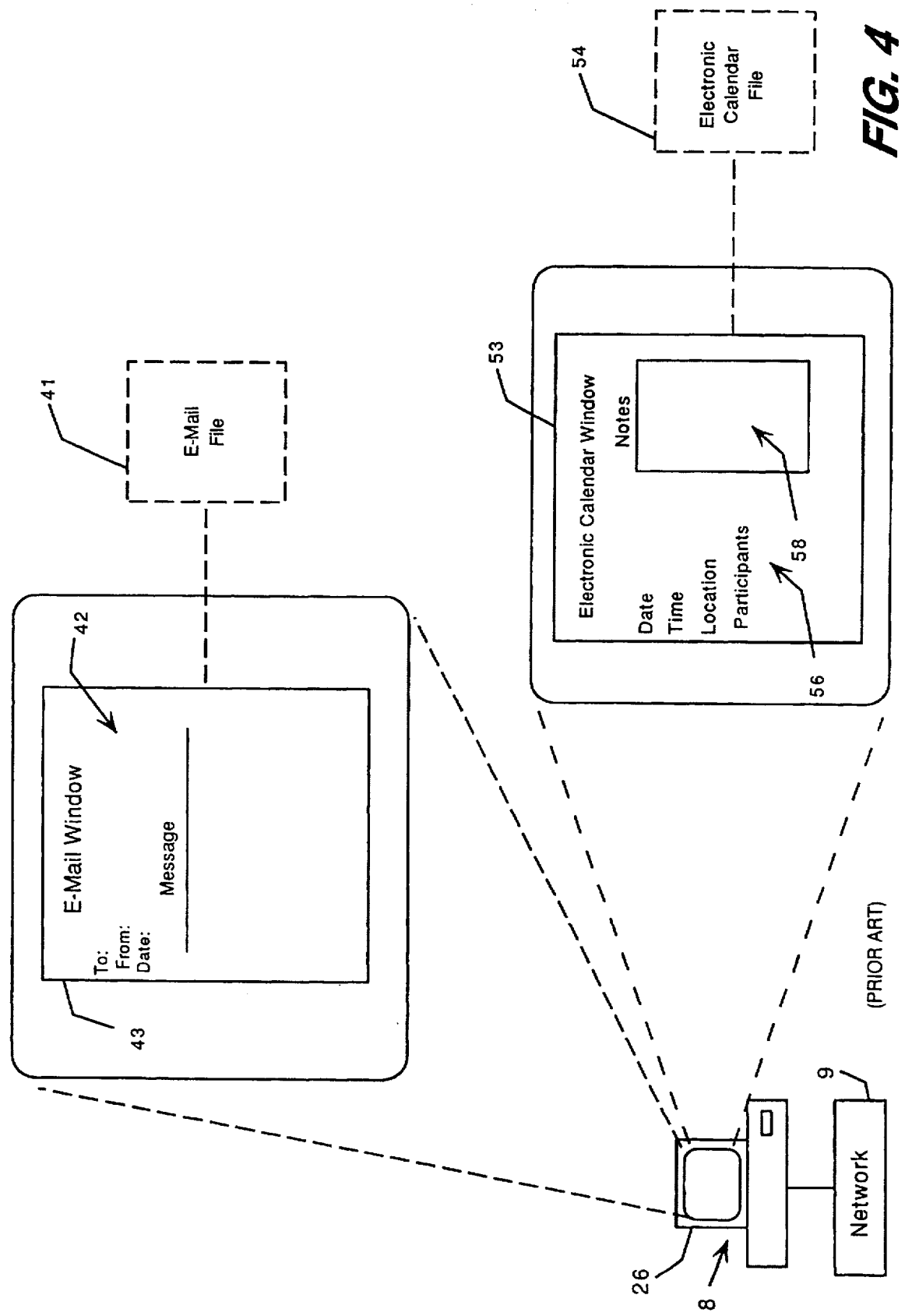
FIG. 4 is a diagram illustrating prior art user interfaces including an e-mail application window and an electronic calendar application window.

FIG. 4 is a diagram illustrating prior art user interfaces including an e-mail application window 43 and an electronic calendar application window 53. Prior to the present invention, the procedures required to extract schedule-related information from an e-mail file 41 and to store it in another file, such as a calendar file 54, were cumbersome. Those skilled in the art will appreciate that each application program running on the computer system 8 typically must be separately launched. Launching an application program can take a period of time ranging from a few seconds to half a minute or so to complete. Therefore, a user wishing to record information from the e-mail file 41 in the calendar file 54 had to first read the e-mail message 42 within the e-mail application window 43, and then launch electronic calendar program 40. Once calendar program 40 was launched, the user had to open the desired calendar file 54 and then scroll or otherwise move through the calendar file 54 so that the information corresponding to the correct date was displayed within the electronic calendar application window 53. The user could then manually transfer the schedule-related information displayed in the e-mail application window 43 into the electronic calendar application window 53.

Transferring the schedule-related information from the e-mail application window 43 to the electronic calendar application window 53 was difficult because typically one application window could be displayed on the monitor 26 at a time. Thus, opening the calendar file 54 caused the display of the e-mail application window 43 to be replaced by the display of the electronic calendar application window 53. The user therefore had to switch back and forth between the e-mail application window 43 and the calendar file application window 53 in order to transfer the schedule-related information. This process was slow, annoying, and presented the user with opportunities to make errors in transferring the data. As described below, an illustrative embodiment of the present invention provides an improved method and system for transferring the schedule-related information from the e-mail application window 43 to the electronic calendar application window 53

Figure 5:
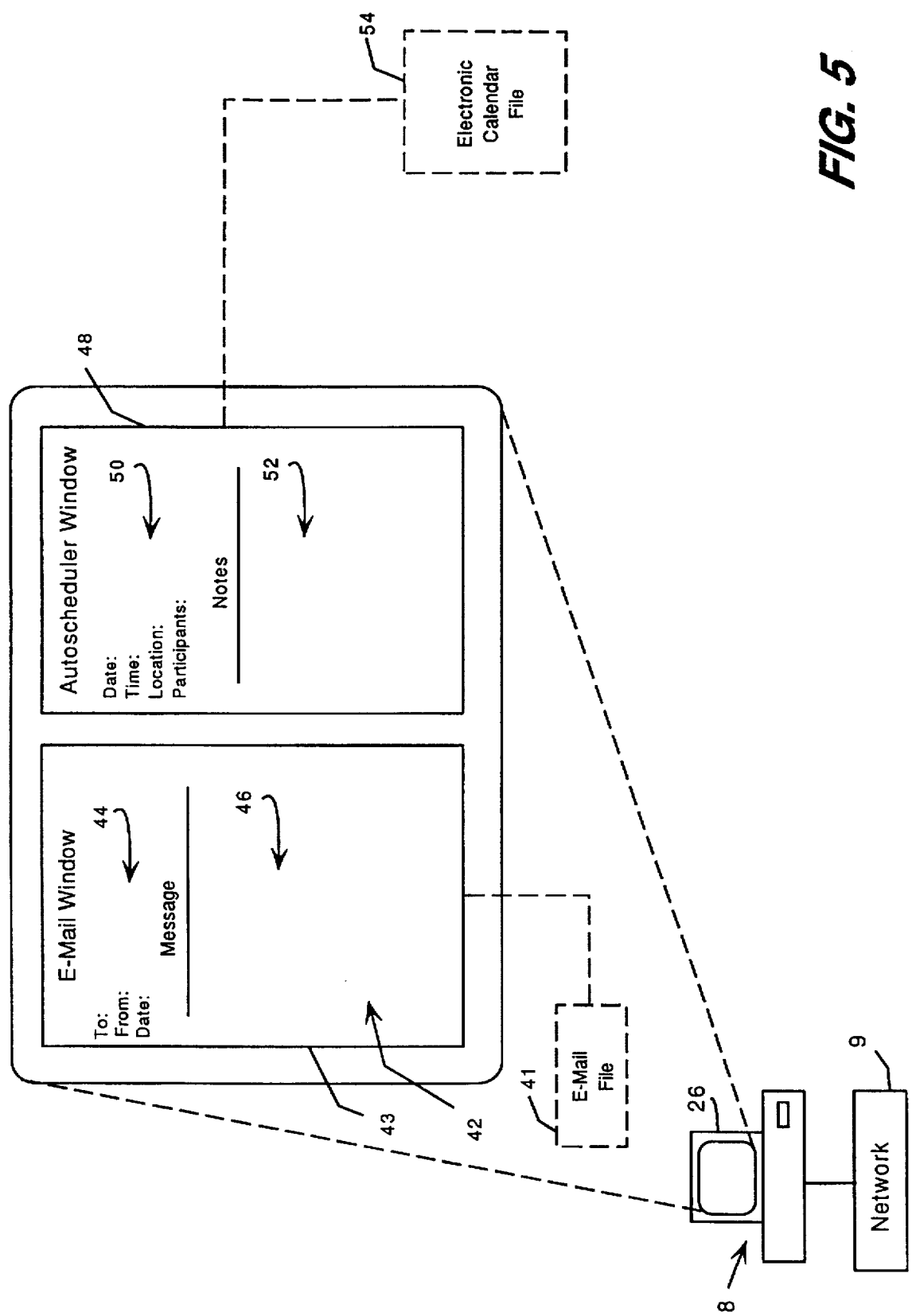
FIG. 5 is a diagram illustrating a user interface displaying an autoscheduler template window and an e-mail application window in accordance with the present invention.

FIG. 5 is a diagram illustrating a user interface including an e-mail application window 43 and a window 48 displaying the target data fields of the application-specific template in accordance with the present invention. We will refer to the window 48 displaying the target data fields of the autoscheduler template as the autoscheduler window 48. Referring now to FIGS. 1 and 5, the e-mail program 36 and the autoscheduler program 38 each use windows to display information to a user. The e-mail program 36 presents the e-mail message 42 from the e-mail file 41 to a user within the e-mail application window 43 displayed on the monitor 26. The autoscheduler program 38 extracts schedule-related information from the e-mail file 41 and presents the extracted information to a user within the autoscheduler window 48 displayed on the monitor 26. The windows 43 and 48 associated with the e-mail program 36 and the autoscheduler program 38, respectively, are typically displayed simultaneously. The autoscheduler window 48 includes target fields 50, 52 that correspond to target fields 56, 58 of the electronic calendar program 40 (FIG. 4).

The electronic calendar program 40 controls the calendar file 54. The autoscheduler program 38 automatically stores the information extracted from the e-mail file 41 in the calendar file 54 without the user having to manually launch the electronic calendar program 40, opens the calendar file 54, and manipulates the electronic calendar application window 53. The user may launch the electronic calendar program 40, open the calendar file 54, and refer to or manipulate electronic calendar application window 53 at a later time.

By presenting the application windows 43 and 48 simultaneously, the autoscheduler program 38 makes it easier to extract schedule-related information from a source file, such as the e-mail file 41, and store the extracted information in a target file, such as the calendar file 54. Moreover, the autoscheduler program 38 automatically interprets data within the e-mail file 41 and makes best guesses as to the information that should be extracted from the e-mail file 41. The extracted terms are incorporated into the autoscheduler template and displayed in the autoscheduler window 48 as a best guess set of target field assignments. The user may complete and/or correct and then save the set of target field assignments displayed in the autoscheduler window 48 in the calendar file 54 in a predefined manner. Thus, the user need not launch the electronic calendar program 40 or open and manipulate the calendar file 54 in the process of interpreting and transferring data from the e-mail file 41 to the calendar file 54.

FIG. 5 shows a graphical user interface for the autoscheduler program 38, in which the e-mail application window 43 and autoscheduler window 48 are displayed side-by-side. The e-mail application window 43 is a semi-structured application window that includes a structured area 44 and a free-text area 46. The autoscheduler window 48 includes a structured area 50 and a free-text area 52. The autoscheduler program 38 interprets and extracts schedule-related information from the e-mail file 41 corresponding to both the structured area 44 and the free-text area 46 of the e-mail application window 43. The information automatically extracted from the e-mail file 41 comprises the best guess of the autoscheduler program 38 regarding the information that should be stored in the calendar file 54.

The autoscheduler program 38 typically displays the extracted best guess information within the structured area 50 of autoscheduler window 48. The user may manually complete and/or correct the information within structured area 50 of the autoscheduler window 48. Optionally, the user may manually input free-text information into free-text area 52 of the autoscheduler window 48. The information displayed in the autoscheduler window 48 may then be automatically stored in the calendar file 54 in a predefined format. It will be appreciated the windows 43 and 48 shown in FIG. 5 illustrate an illustrative embodiment of the present invention and that many variations may be made to the disclosed windows 43 and 48 within the spirit and scope of the present invention.

Figures 6A, 6B, 6C:
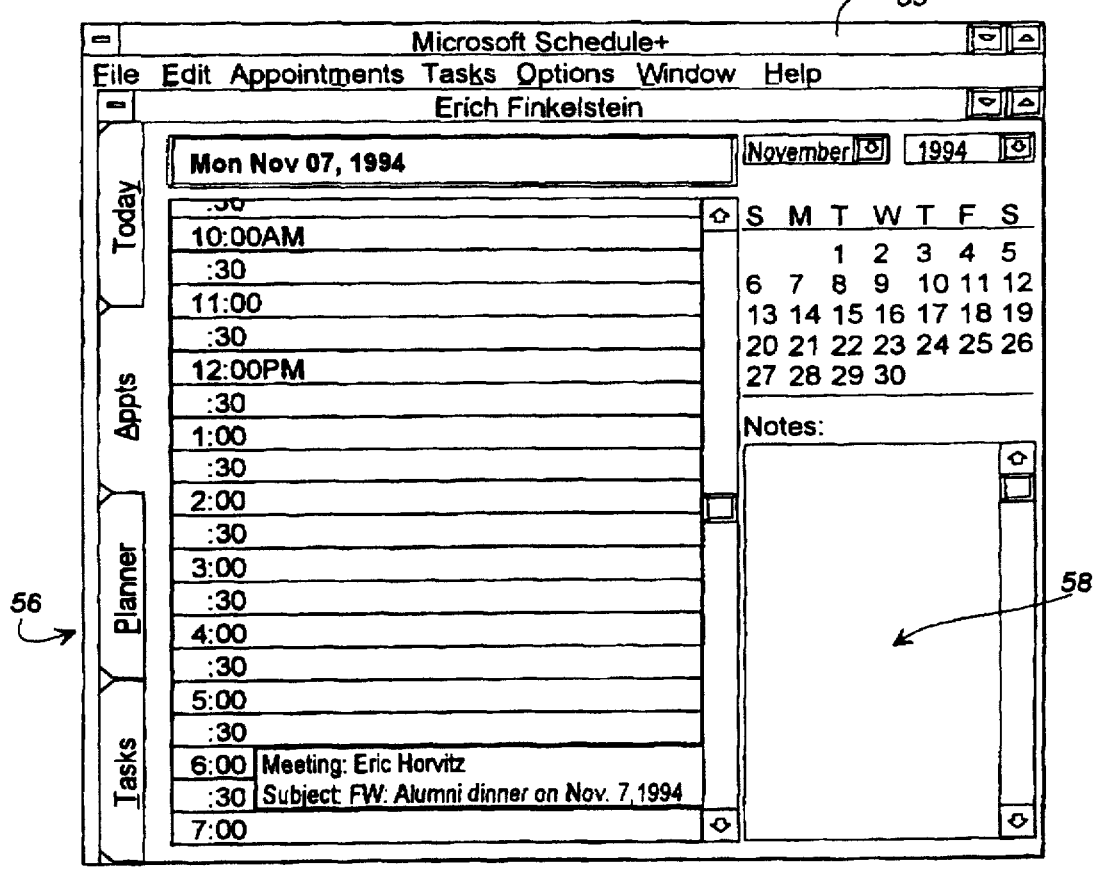
FIGS. 6A–6C, shows an e-mail application window, an autoscheduler template window, and an electronic calendar application window.

FIG. 6 shows the e-mail application window 43 and the autoscheduler window 48 with more particularity. FIG. 6A shows the structured area 44 of the e-mail application window 43, which includes fields containing predefined information. Specifically, the structured area 44 of the e-mail application window 43 includes a "from" target field for identifying the sender of the e-mail message 42, a "to" target field for identifying the recipient of the e-mail message 42, a "cc" target field for identifying recipients of copies of the e-mail message 42, a "subject" target field for a short description of the subject of the e-mail message 42, and a "date" target field for indicating the date on which the e-mail message 42 was sent. The e-mail application window 43 also includes a free-text area 46, which typically contains free-text information created by the author of the e-mail message 42. Information including message terms input by the author of the e-mail message 42 typically fills the free-text area 46 and the fields of the structured area 44. The autoscheduler program 38 interprets the information within, and extracts schedule-related information from, both structured area 44 and free-text area 46 of the e-mail application window 43.

FIG. 6B shows the structured area 50 of the autoscheduler window 48 which displays the target fields of the autoscheduler template. The autoscheduler window 48 may also include a free-text area 52. Each field of the structured area 50 may contain schedule-related information to be recorded in a corresponding target field within the calendar file 54. Specifically, the structured area 50 of the autoscheduler window 48 includes a "date" target field for identifying the date of a meeting, a "time" target field for identifying the starting and ending times of the meeting, a "place" target field for identifying the location of the meeting, and an "attendees" target field for identifying the meeting attendees. These target fields of autoscheduler window 48 have corresponding target fields within the calendar file 54 (FIG. 4).

The autoscheduler program 38 fills the target fields in the structured area 50 of the autoscheduler window 48 with message terms extracted from the e-mail file 41 that correspond to the structured area 44 and the free-text area 46 of the e-mail application window 43. The autoscheduler program 38 may also interpret and alter e-mail message terms. For example, the e-mail message term "tomorrow" may be interpreted with reference to the date of the e-mail message 42 and changed into a date in month, day, year format.

FIG. 6C shows the electronic calendar application window 53. The electronic calendar application window 53 includes a structured area 56 and a free-text area 58. The free-text area 58 of the electronic calendar application window 53 typically includes the information from the free-text area 52 of the autoscheduler window 48. Referring back to FIG. 6A, it will be appreciated that information to be recorded in the structured area 56 of the calendar file 54 depends on the context of the free-text information in the e-mail file 41. Interpreting free-text information is a cognitive function that is difficult to emulate with programmed logic. Although the autoscheduler program 38 includes intelligence for interpreting free-text information, it does not always do so with perfect accuracy. Rather, the autoscheduler program 38 makes a best guesses (i.e., one best guess for each target field of the electronic calendar application window 53) at interpreting the information within the e-mail file 41, displays the best guesses to the user in the autoscheduler window 48, and allows the user to complete and/or correct the information within the autoscheduler window 48. The autoscheduler program 38 also provides the user with alternative choices for target field entries either by providing alternative choices for a particular target field selectable via a pop-down menu or for a new set of target fields if available from the analysis of the free-text information.

FIG. 7 shows a logic flow diagram for an illustrative embodiment of a computer-implemented process 1000 for a goal-driven information interpretation and extraction application program, such as the autoscheduler program 38. In step 1100, the computer-implemented process 1000 receives a source file containing free-text information, such as the e-mail file 41. Referring to FIG. 6A, the e-mail file 41 includes structured data corresponding to the structured area 44 of the e-mail application window 43 and free-text data corresponding to the free-text area 46 of the e-mail application window 43. The e-mail file 41 typically includes schedule-related message terms, some of which may correspond to the structured area 44 of the e-mail application window 43. But most of the schedule-related message terms are typically embedded within the free-text data corresponding to the free-text area 46 of the e-mail application window 43.

In routine 1200, the goal of the information interpretation and extraction system is ascertained. For the disclosed autoscheduler 38, the goal is to extract schedule-related information from the e-mail file 41 and to store the extracted information in the calendar file 54. As noted previously, the principles of the present invention could be applied to many different types of goal-driven information interpretation and extraction programs, an example of which is the autoscheduler 38 described in detail herein. Routine 1200 therefore allows a user to select among a plurality of goal-driven information interpretation and extraction algorithms having different goals and different target files. Thus, the computer-implemented process 1000 must first ascertain the goal for which the user wants to extract information from the source file. For example, the computer-implemented process 1000 may infer a goal based on the content of the source file, or the user may designate a goal on a case-by-case basis using a conventional selection device, such as a pull-down menu. The steps associated with routine 1200 for ascertaining the goal of the information interpretation and extraction system are described with more particularity with reference to FIG. 8.

In routine 1300, the extractor associated with the target file is identified and executed. The extractor uses an application-specific rule base with each application-specific template. Each rule base is a system of rules for interpreting message terms and assigning the message terms to target fields in the application-specific template. For example, the rule base may include rules for interpreting the meaning of message terms based on hints, such as punctuation and the relative position of terms in a message. Continuing with the e-mail and autoscheduler example, the source file is the e-mail file 41, the target file is the electronic calendar file 54, and the extractor is the autoscheduler program 38.

In routine 1400, the message terms in the source file are interpreted and certain message terms are automatically assigned to target data fields in the application-specific template. For example, continuing with the e-mail and autoscheduler example, the e-mail message terms from the e-mail file 41 are assigned to target data fields in the autoscheduler template. As noted previously, the autoscheduler window 48 and the e-mail application window 43 are typically displayed on the computer monitor 26 simultaneously. The target data fields displayed in the window 48 are tied to structured fields of the calendar file 54 so that by entering data into the target data fields of the autoscheduler window 48, the user specifies an entry to be made in the calendar file 54.

According to one aspect of the present invention, the computer-implemented process 1000 automatically makes best guesses as to the e-mail message terms from the e-mail file 41 that should be included in the target fields of the application-specific template. Thus, the user has a head start on transferring information from the source file to the target file and need only complete and/or correct the information initially assigned to the target data fields of the application-specific template displayed to the user by the computer-implemented process 1000. The steps associated with routine 1400 for automatically interpreting and assigning message terms to the target data fields in the application-specific template are describe with more particularity with respect to FIGS. 9–10.

In step 1500, the target data fields of the application-specific template is presented to the user for completion and/or correction. In the illustrative embodiment, the user manually inputs information into the autoscheduler window 48 or selects from entries made available by the computer-implemented process 1000 through pull-down menus. Upon an indication from the user that the information contained in the autoscheduler window 48 is complete and correct, the information displayed in the autoscheduler window 48 is stored in the calendar file 54. The steps associated with routine 1500 for allowing the user to interactively complete and/or correct the target data fields of the application-specific template are described with more particularity with reference to FIG. 11.

In routine 1600, the target data fields of the application-specific template are saved in the calendar file 54. In addition, routine 1600 provides for updating the lexicon of the template that was used to extract and assign data to the application-specific template. This allows the lexicon of the autoscheduler program 38 to be updated with information learned from manual user input. The steps of routine 1600 for saving the target data fields of the application-specific template are described with more particularity with respect to FIG. 12.

The computer-implemented process 1000 illustrated in FIGS. 7 through 12 provides a convenient method for a user to extract schedule-related information from source files for storage in target files. It will be appreciated that a user may be interacting with any of a variety of application programs on the computer system 8 when the user decides to read his or her e-mail. At a convenient point in time for reading e-mail, the user may select an e-mail icon on a menu bar to activate the e-mail program 36. The e-mail program 36 then displays an e-mail message 42 in the e-mail application window 43 on the computer monitor 26. If the e-mail message 42 contains schedule-related information, the user may quickly activate the autoscheduler program 38 in a conventional manner, for example by clicking an icon on a menu bar. This simple action invokes the autoscheduler program and, if necessary, displays the autoscheduler window 48 to simultaneously appear on the screen with the e-mail application window 43.

Upon activation of the autoscheduler program, the target data fields of autoscheduler template are automatically populated with best guesses as to which message terms from the e-mail file 41 should be included in the target calendar file 54. The user may quickly complete and/or correct the set of target field assignments in the autoscheduler window 48 and saves the results. In this manner, the user quickly transfers information from the e-mail file 41 to the target calendar file 54. The user may then return to the application program the user was interacting with when the user decided to read his or her e-mail.

Figure 8:
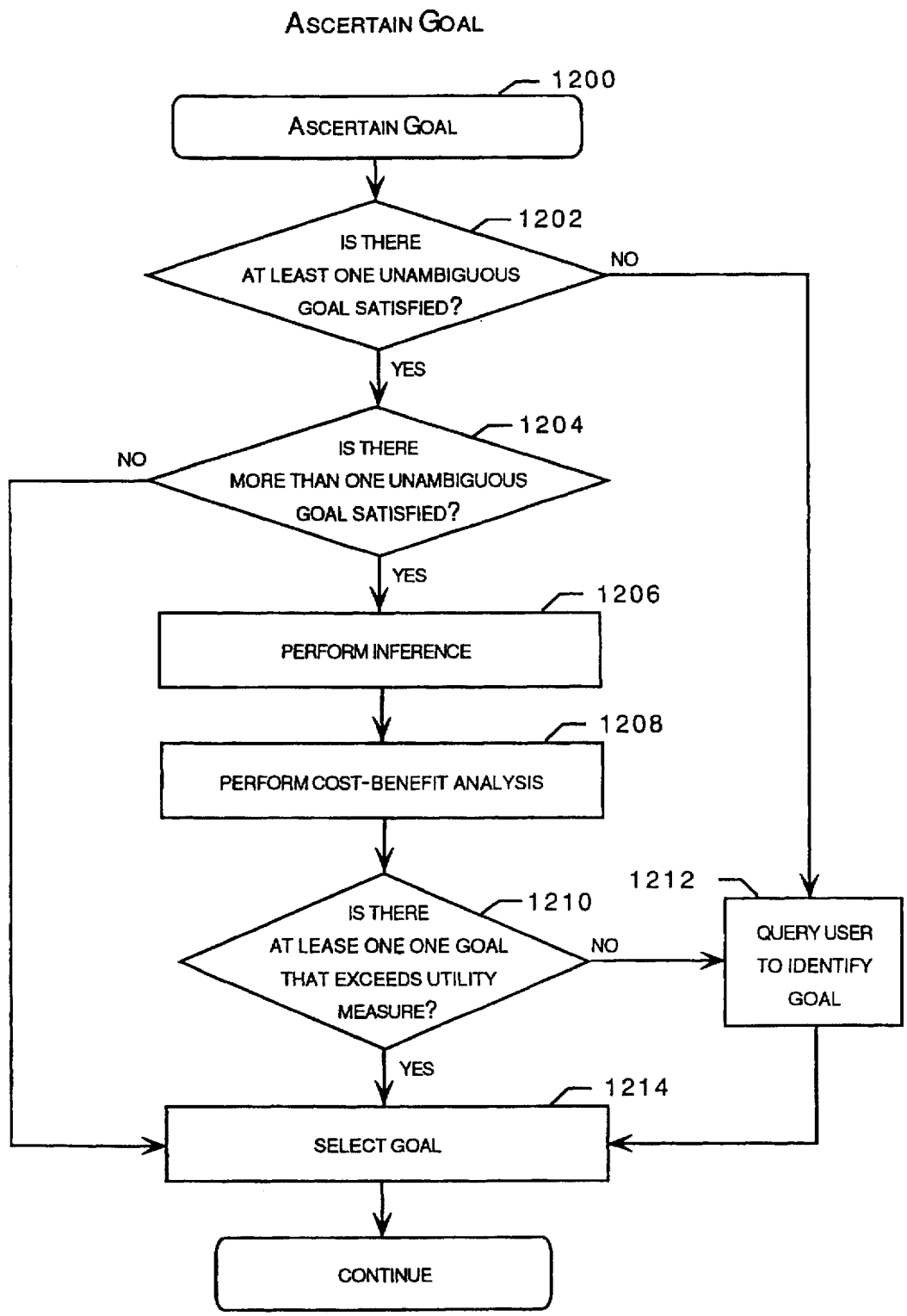
FIG. 8 is a logic flow diagram showing the steps of a computer-implemented process for ascertaining the goal in the illustrative embodiment of a goal-driven information interpretation and extraction system, the electronic mail autoscheduler.

FIG. 8 is a logic flow diagram illustrating the steps of routine 1200 for ascertaining the goal of the automatic information interpretation and extraction system. Those skilled in the art will appreciate that the decision engine 208 may use alternatively probabilistic reasoning such as Bayesian inference or logical reasoning employing a rule base to analyze the system context and user commands to determine which goals of a set of system defined goals are unambiguously satisfied. In step 1202, the decision engine 208 determines if there is at least one unambiguous goal satisfied. If there are no goals determined to be unambiguously satisfied, then a pop-up dialog window is presented to the user to identify the goal intended by the user at step 1212. The goal selected by the user is the goal ascertained at step 1214. Where the decision engine 208 has identified only a single goal to be unambiguously satisfied at step 1204, then that goal is selected at step 1214 as the ascertained goal.

If the decision engine 208 has unambiguously determined that more than one goal has been satisfied, then the decision engine performs an inference analysis at step 1206 using probabilistic reasoning or alternatively logical reasoning to analyze system context and user commands as discussed above. The inference results of step 1206 are input to a cost-benefit analysis performed at step 1208 to determine which goals exceed defined utility measures. If the decision engine 208 at step 1210 does not find at least one goal that exceeds it's defined utility measure as a result of the cost-benefit analysis performed at step 1208, then a pop-up dialog window is presented to the user to identify the goal intended by the user at step 1212. The goal selected by the user is the goal ascertained at step 1214. Where there is at least one goal that exceeds it's defined utility measure as a result of the cost-performance analysis performed at step 1208, then the decision engine 208 selects the first goal at step 1214 as the ascertained goal. After step 1214, the computer-implemented process 1000 continues with routine 1300.

In an alternative embodiment, when the decision engine 208 has unambiguously determined at step 1204 that more than one goal has been satisfied, steps 1206, 1208 and 1210 are skipped and a pop-up dialog window is presented to the user to display an alphabetical list of goals for the user at step 1212. It will appreciated that routine 1200 provides flexibility for different users to select different goals. This allows users to tailor the operation of the computer-implemented process 1000 to their particular needs. This aspect of the disclosed embodiment of the present invention makes the computer-implemented process 1000 useful for a wide variety of users.

In the illustrative embodiment disclosed, the autoscheduler program 38 uses a set of simple rules to ascertain whether the goal of extracting scheduling information from an e-mail message for automatically scheduling an appointment in a calendar file is unambiguously determined. For example, as a first rule, if e-mail is open and the user enters a special keyboard command, Alt-A, then the goal of extracting scheduling information from the e-mail message is unambiguously determined to be the goal intended by the user. As a second rule, when an e-mail message is selected and dragged to the calendar icon, the goal of extracting scheduling information from the e-mail message is unambiguously determined to be the goal intended by the user. Alternatively, the user may select a goal, for example by selecting an item in a menu bar or in a pull-down menu. The user reading the e-mail message may realize after reading the e-mail message that the message contains information that the user wants to store in a particular target file. The user may then click on an icon in a menu bar to access a pull-down menu or otherwise input a command signal such as a keyboard command sequence to indicate the target file or that the associated extractor such as the autoscheduler should be run.

Figure 9:
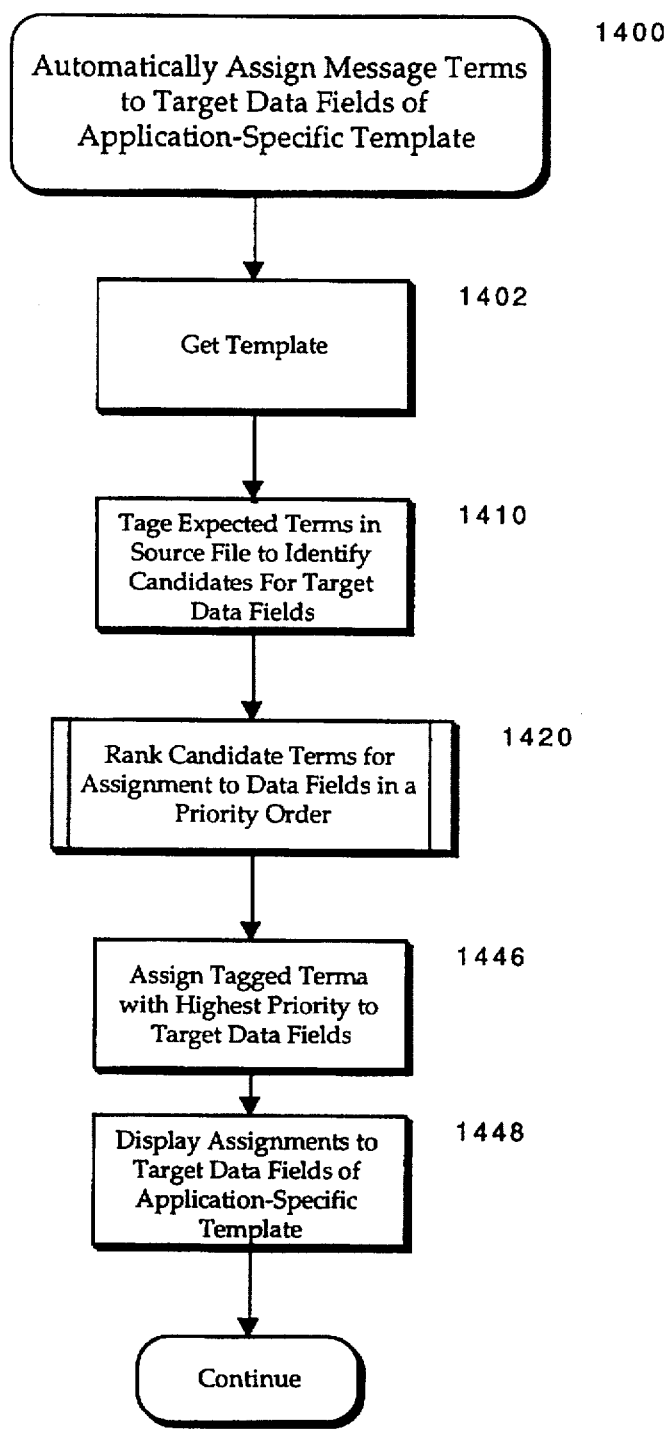
FIG. 9 is a logic flow diagram showing the steps of a computer-implemented process for automatically assigning data to an application-specific template in a goal-driven information interpretation and extraction system.

FIG. 9 illustrates the steps of routine 1400 that the extractor 210 employs when executed at step 1300 of FIG. 7 for automatically assigning data from the source object to the application-specific template. In the illustrative embodiment, the source object is the e-mail file 41, and the application-specific template is the autoscheduler template. Routine 1400 uses the autoscheduler template for assigning message terms from the e-mail file 41 to the target data fields the calendar file 54. Routine 1400 also ranks the candidate terms for assignment to the target data fields in a priority order. In step 1402, the template for extracting information from the source object is retrieved from memory. In the illustrative embodiment, the autoscheduler template includes a group of "tokens" that correspond to target data fields in the electronic calendar file 54. Each token corresponds to a group of expected terms for which the computer-implemented process 1000 searches in the source file. The autoscheduler uses a rule base for interpreting message terms, tagging expected terms found in the e-mail message with a token, and assigning the tagged words to target fields in autoscheduler template.

In step 1410, the autoscheduler program tags expected terms appearing within the e-mail 41 with their respective tokens. For example, the autoscheduler may use the template to tag the terms "today," "tomorrow," "next Friday," etc. with the token "day word." The "day word" token corresponds to the "date" target data field in the electronic calendar file under which the extracted information will ultimately be stored. Known irrelevant terms are automatically skipped. Known irrelevant terms typically include the legends of the structured fields of the e-mail application window 43, such as "to," "from," "cc," "subject," and "date." These terms cannot comprise part of the schedule-related information and are therefore excluded from further consideration as expected terms. These terms may, however, provide useful hints for interpreting other message terms.

Once the expected terms of the e-mail message are tagged, at step 1420 the candidate tagged terms are ranked in priority order for assignment to the target data fields of the electronic calendar file 54. An illustrative process for ranking candidate tagged terms in priority order for assignment to the target data fields of the autoscheduler template is described with more particularity with reference to FIG. 10. At step 1446, the candidate tagged terms with the highest priority are assigned to the target data fields of the autoscheduler template. In step 1448, the autoscheduler window 48 including the best guess set of target field assignments is displayed to the user. The computer-implemented process 1000 then continues with routine 1500 (FIG. 11).

Figure 10:
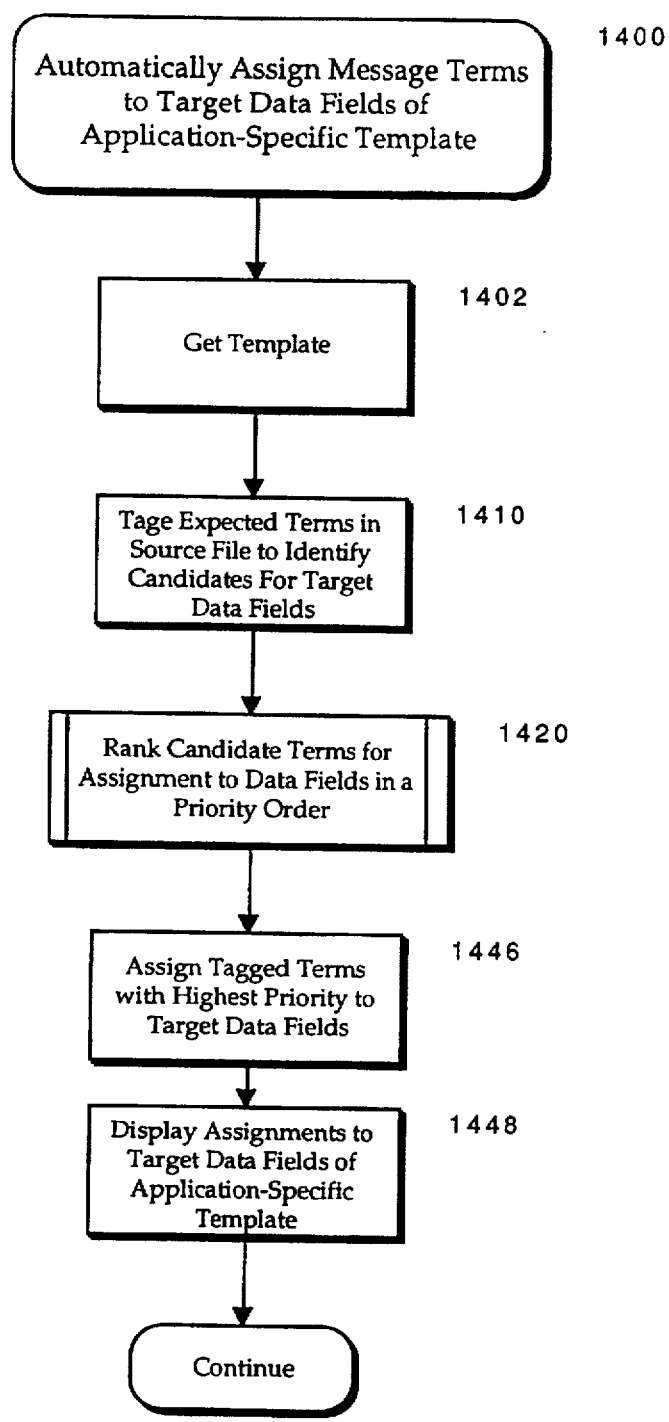
FIG. 10 is a logic flow diagram showing the steps of a computer-implemented process for ranking candidate tagged terms for assignment to target data fields of an application-specific template for a goal-driven information interpretation and extraction system.
Figure 11:
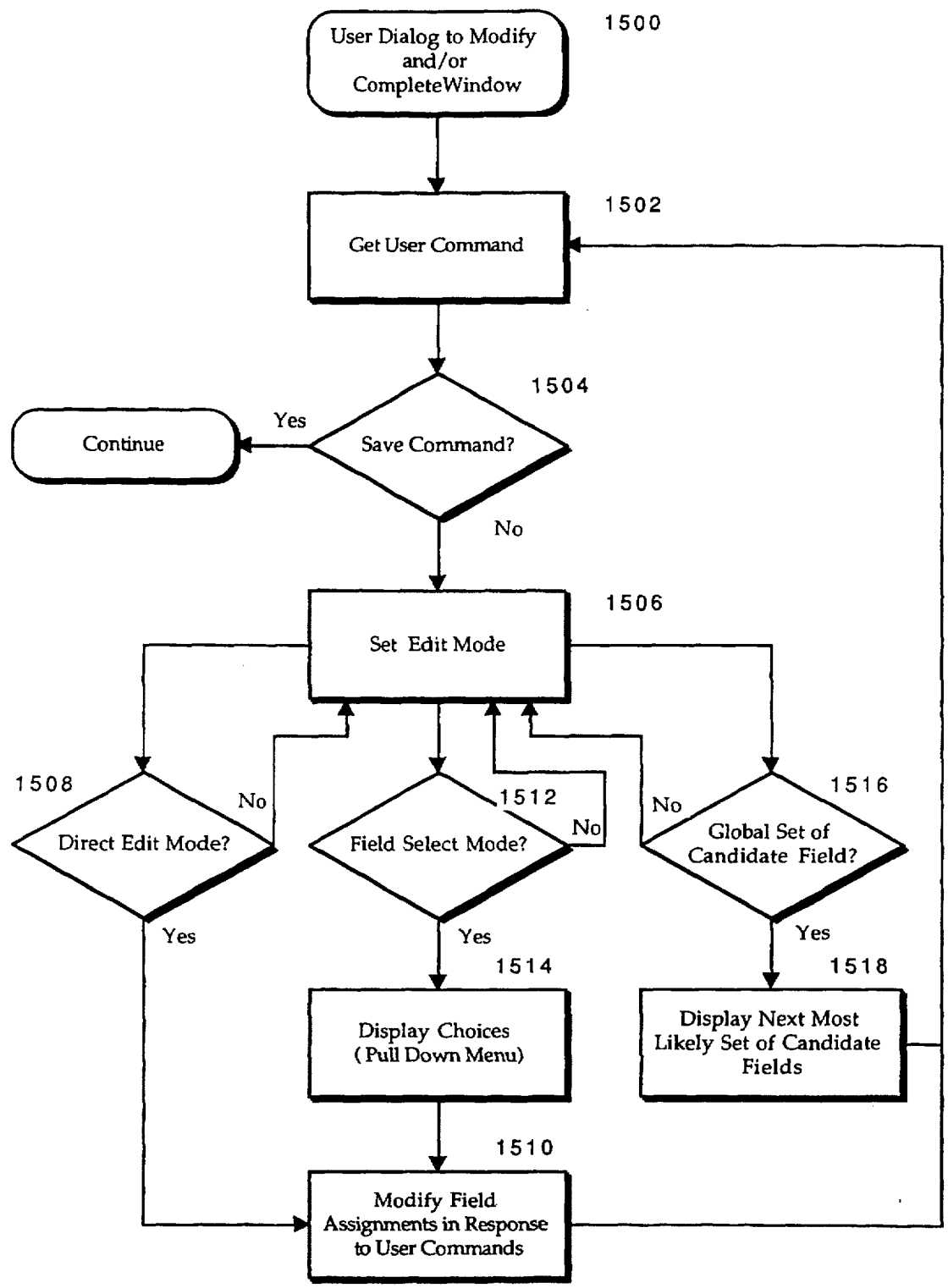
FIG. 11 is a logic flow diagram showing the steps of a computer-implemented process for presenting target data fields of an application-specific template in a display window to a user for review and modification in a goal-driven information interpretation and extraction system.

FIG. 10 illustrates an exemplary process for ranking candidate tagged terms in priority order for assignment to the target data fields of an application-specific template. In step 1422, the tagged terms are grouped into clusters to build sets of candidate terms for assignment to the template target fields. A tagged term is grouped into a cluster based on its spatial relationship to other tagged terms in the source file. For example, all tagged terms that are within four message terms of another tagged term may be grouped into the same cluster.

In step 1430, the clusters are ranked in a priority order. It has been discovered that clusters that contain more relevant terms are generally more likely to include important information, and that clusters in which the relevant terms are more tightly grouped are generally more likely to include important information. One method for ranking the clusters therefore assigns a higher priority to clusters that contain a higher numbers of expected terms. This ranking method also assigns a higher priority to clusters that include terms that are closer together. Specifically, the following formula may be used to rank clusters:

$$\text{cluster value} = \frac{\sum_{1}^{k-1} |a_i - a_{i+1}|}{k^2}$$

where k is the number of relevant terms in the cluster and $a_i$ is the number of message terms from the relevant term(i) to the beginning of the e-mail file. The exponent "2" may be varied. In step 1444, the cluster of tagged terms with the highest priority is selected for assignment to target fields in the application-specific template.

In an alternative embodiment, rather than building a set of fields and then scoring the set of fields as described above in reference with FIG. 10, each target data field of the template, all the candidates for a single field can be ranked and scored before proceeding to the next field. The order in which the fields have candidates ranked and scored may vary based upon the source object and the target object.

An exemplary method is described for automatically generating and refining a scoring function which may be used to rank candidate terms in priority order. The first step is to acquire a set of source objects from which data objects will be extracted and applied to an application-specific target object. For the illustrative embodiment, the set of source objects are a set of e-mail messages containing scheduling information. The next step is to identify a set of distinction in the content of the source objects that express some structural relationship to candidate terms of interest which will be applied to the target object. These distinctions may include: the occurrence of special words within words before a candidate term(s) of interest; the occurrence of special words within words after candidate terms(s) of interest; the occurrence of special words somewhere in the document before a candidate term of interest; the occurrence of special words somewhere in the document after a candidate term of interest; the general location of the candidate in the document (e.g., in the first half or second half of the document); the location of other candidates in the document with regard to a particular candidate; and the particular form of the candidate (e.g., an abstract reference such as the following for referring to a particular date—"today," "tomorrow," or an abbreviation for a particular day).

After a set of distinctions have been identified that express some structural relationship to candidate terms of interest, a set of target objects that have been correctly instantiated manually are selected to gather probabilistic information for each term on the relationships between the observations of distinctions and the correct candidates. This information can include the probability that a distinction is found to be present, given that a term is the correct term for the field in the application-specific template. For example, considering the time of a meeting in the illustrative embodiment of the autoscheduler, data is collected on the probability p(distinction x see correct date y) where distinction x can be the word "at" seen adjacent to a term tagged as a candidate time. At runtime, Bayes rule is applied to take a set of such probabilities for a variety of distinctions and compute the approximate probability of the correct date given multiple distinctions, p(correct date y distinctions 1 ... n), for each candidate time.

Figure 12:
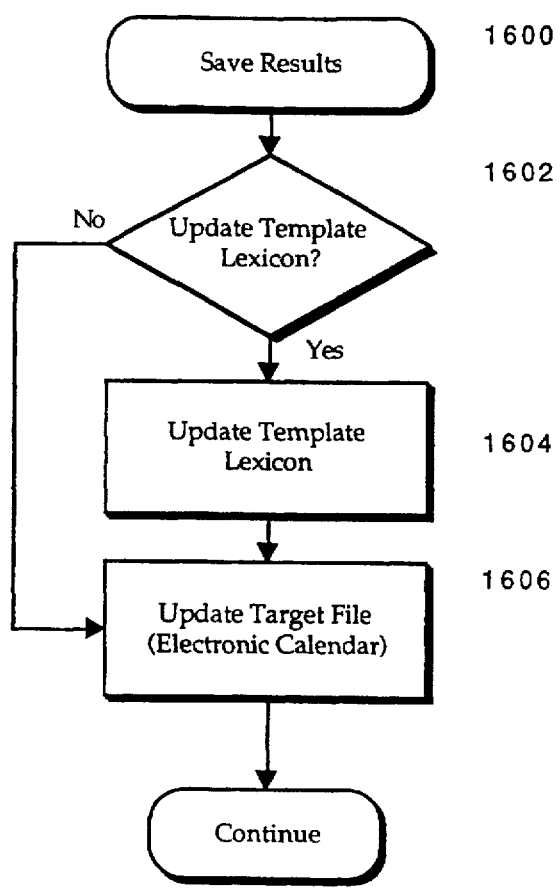
FIG. 12 is a logic flow diagram showing the steps of a computer-implemented process for saving the results in a goal-driven information interpretation and extraction system.

FIG. 11 shows the steps of routine 1500 for obtaining user input to modify and/or complete a set of target data field assignments for the application-specific template. Referring to FIG. 9, in step 1448, the best guess set of target data field assignments to the application-specific template are displayed within the autoscheduler window 48 on the monitor 26. In step 1502, the computer-implemented process 1000 gets a user command, typically either a save command or a command to modify the set of target field assignments displayed in the autoscheduler window 48. In decision step 1504, it is determined whether the user command is a save command. If the user command is a save command, the "yes" branch is followed from step 1504 to the continue step, in which the computer-implemented process 1000 continues with routine 1600 (FIG. 12). If the user command is not a save command, the "no" branch is followed from step 1504 to step 1506, in which the edit mode is set.

There are three exemplary modes for editing the target field assignments of the application-specific template.: (1) the direct edit mode, (2) the target field select mode, and (3) the global candidate field set mode. The direct edit mode allows the user to manually edit the information on a per-target-field basis. The target field select mode allows the user to select alternatives using a pull-down menu on a per-target-field basis. The global candidate set field mode allows the user to select a new cluster of candidate fields when more than one cluster exists.

In decision step 1508, it is determined whether edit mode is set to the direct edit mode. If the edit mode is not set to the direct edit mode, the "no" branch is followed from 1508 back to 1506. If the edit mode is set to the direct edit mode, the "yes" branch is followed to step 1510, in which the autoscheduler window 48 is modified in response to manual user edit commands. In the direct edit mode, the user simply types the desired data directly into the target fields of the autoscheduler window 48.

In decision step 1512, it is determined whether the edit mode is set to the target field select mode. If edit mode is not set to the target field select mode, the "no" branch is followed from step 1512 back to 1506. If the edit mode is set to the target field select mode, the "yes" branch is followed from step 1512 to step 1514, in which alternatives for a particular target field of the autoscheduler template are displayed. Typically, the target field select mode works with a pull-down menu that displays a set of alternatives for a particular target field in the application-specific template. In step 1510, one of the alternatives from the pull-down menu is selected in response to user commands.

In decision step 1516, it is determined whether the edit mode is set to the global candidate field set mode. If the edit mode is not set to the global candidate field set mode, the "no" branch is followed from step 1516 back to step 1506. If the application window edit is set to the global candidate field set mode, the "yes" branch is followed from step 1516 to step 1518. In step 1518, the next most likely set of candidate fields as determined by ranking step 1430 is displayed. After steps 1518 and 1510, routine 1500 loops back to step 1502, in which the computer-implemented process 1000 receives another user command. It will be appreciated that routine 1500 loops through steps 1502 through 1518 until the user is satisfied with the entries in the application-specific template and inputs a save command. Another command for exiting routine 1500, such as an abort or exit command, may be provided to exit this routine without saving the results.

FIG. 12 shows the steps of routine 1600 for saving the target data field assignments of the application-specific template to the target object. In decision step 1602, it is determined whether the template lexicon should be updated. Typically, a user specifies when the template lexicon should be updated on a case-by-case basis. This allows the user to identify changes made to a particular template that the user wishes to be permanently stored as part of the template lexicon. If the template lexicon is to be updated, the "yes" branch is followed from step 1602 to step 1604, in which the template lexicon is updated. If the template lexicon is not to be updated, the "no" branch is followed from step 1602 to step 1606. Step 1604 is followed by step 1606, in which the target file is updated. For example, referring to the illustrative embodiment of the autoscheduler, the calendar file 54 is updated with the information included in the application-specific template 48.

The preferred templates and rules for implementing an autoscheduler according to the present invention are included in the "Attachment 1," which is appended hereto. It should be understood that the foregoing description and "Attachment 1" relate only to the illustrative embodiment of the present invention, and that numerous changes may be made therein without departing from the spirit and scope of the invention as defined by the following claims. Because of the variations that can be applied to the illustrated and described embodiments of the invention, the invention should be defined solely with reference to the appended claims.

What is claimed is:

1. A method for extracting information from a source object and storing the extracted information in a target object, comprising the steps of:

selecting a source object with untagged information;

selecting a target object that stores data objects extractable from the untagged information of the source object, interpreting free-text information within the source file;

based on the interpretation, extracting data objects of the type that are storable in the target object from the untagged information of the source object; and storing the data objects in the target object.

2. The method of claim 1 wherein the step of interpreting free-text information within the source file further comprises the steps of:

accessing a template of data patterns, each data pattern being associated with one or more of the data objects to be stored in the target object;

searching for occurrences of each data pattern within the source object;

tagging each occurrence of each data pattern found within the source object;

assigning each tagged data pattern to at least one of the data objects; and ranking the data objects in a priority order.

3. The method of claim 2 wherein the step of ranking the data objects in a priority order further comprises the steps of:

applying a Bayesian inference engine to rank the data objects by likelihood of their correctness;

grouping the tagged target data objects into a plurality of clusters; and ranking the clusters in a priority order.

4. The method of claim 1 wherein the step of selecting a source object further comprises the step of receiving a user command from a user input device selecting the source object.

5. The method of claim 1 wherein the step of selecting a target object further comprises the step of applying an inference engine to select the target object.

6. The method of claim 1 wherein the step of selecting a target object further comprises the step of receiving a user command from a user input device associating the target object with the source object.

7. A method for interpreting and extracting terms from a free-text portion of a source file, comprising the steps of:
retrieving the source file;
retrieving a application-specific template comprising one or mote target fields for accepting assignments, the target fields being associated with data items to be recorded in a target file;
retrieving a template comprising a plurality of expected terms, each expected term being associated with one or more target fields of the application-specific template;
tagging terms, within the free-text portion of the source file, that correspond to one or more of the expected terms;
grouping the tagged terms into a plurality of clusters;
ranking the clusters in a priority order; and
assigning the tagged terms to the target fields in the priority order.

8. The method of claim 7, wherein:
the application-specific template is selected from a plurality of predefined application-specific templates based on a goal inferred from data within the source file;
the template is selected from a plurality of predefined templates based on the goal inferred from data within the source file; and
the target file is selected from a plurality of predefined target files based on the goal inferred from data within the source file.

9. The method of claim 7, further comprising the steps of:
presenting the application-specific template including the target field assignments to a user for review and modification; and
in response to a user command, storing the target field assignments in the target file.

10. The method of claim 9, further comprising the step of:
in response to a user command, presenting a list of alternative assignments for one or more of the target fields.

11. The method of claim 10, further comprising the step of:
in response to a user command, changing the assignment for one or more of the target fields.

12. The method of claim 11, wherein alternative target field assignments are displayed in a pop-up window on a monitor.

13. The method of claim 9, wherein the source file comprises terms in structured fields.

14. The method of claim 13, wherein the source file is an electronic mail file.

15. The method 13, wherein the target file is an electronic calendar file.

16. The method of claim 11, further comprising the step of updating the template to reflect the changed target field assignment.

17. A computer-readable medium storing a program module comprising instructions which, when executed by a computer system comprising a processing unit, a memory storage device, and a user input/output system including a monitor, cause the computer system to interpret and extract terms from a free-text portion of a source file by performing the steps of:
retrieving the source file;
retrieving an application-specific template comprising one or more target fields for accepting assignments, the target fields being associated with data items to be recorded in a target file;
retrieving a template comprising a plurality of expected terms, each expected term being associated with one or more target fields of the application-specific template;
tagging a set of terms, within the free-text portion of the source file, that correspond to one or more of the expected terms;
grouping the tagged terms into a plurality of clusters;
ranking the clusters in a priority order;
assigning the tagged terms to the target fields in the priority order; and
displaying the application-specific template including the selected target field assignments on the monitor for review and modification.

18. A computer-readable medium storing a program module comprising instructions which, when executed by a computer system comprising a processing unit, a memory storage device, and a user input/output system including a monitor, cause the computer system to interpret and extract terms from free-text information by performing the steps of:
displaying a first window on the monitor;
displaying a portion of the free-text information within the first window;
inferring a goal based on the free-text information;
in response to the goal,
selecting a second window from a plurality of application-specific templates, the second window comprising one or more target fields for accepting assignments, the target fields being associated with data items to be recorded in a target file, and
retrieving a template from a plurality of predefined templates, the selected template comprising a plurality of expected terms, each expected term being associated with one or more target fields of the application-specific template;
tagging a set of terms, within the free-text information, that correspond to one or more of the expected terms;
grouping the tagged terms into a plurality of clusters;
ranking the clusters in a priority order;
assigning the tagged terms to the target fields of the second window in the priority order;
displaying the second window on the monitor; and
displaying the assigned terms on the monitor within the target fields of the second window.

19. The computer-readable medium of claim 18, wherein the first and second windows are displayed simultaneously on the monitor.

20. A computer-readable medium storing a program module comprising instructions which, when executed by a computer system comprising a processing unit, a memory storage device, and a user input/output system including a monitor, cause the computer system to perform the steps of:
recognizing a user gesture;
ascertaining a user goal associated with the user gesture;
identifying goal-related source information in one or more source objects;
interpreting free-text information within the source file;
based on the interpretation determining a relevant portion of the source information;

extracting the relevant portion of the source information;

identifying one or more target objects; and altering the target objects by applying the extracted information to the target objects.

21. The computer-readable medium of claim 20, wherein the step of ascertaining a user goal further comprises the step of inferring a user goal based on a predefined system context and a pattern of user commands received during a current user interface session.

22. The computer-readable medium of claim 20, wherein the instructions further cause the computer to perform the steps of:

before the step of determining a relevant portion of the source information, presenting on the user input/output system a query whether to proceed with a proposed data extraction, receiving a user command to proceed with the proposed data extraction, and retrieving the source objects from the memory storage device.

23. The computer-readable medium of claim 22, wherein the instructions further cause the computer to perform the steps of:

after the step of altering the target objects by applying the extracted information to the target objects, presenting on the user input/output system a query whether to proceed with a proposed data storage, receiving a user command to proceed with the proposed data storage, and storing the altered target objects in the memory storage device.

* * * * *

UNITED STATES PATENT AND TRADEMARK OFFICE
CERTIFICATE OF CORRECTION

PATENT NO. : 5,864,848
DATED : January 26, 1999
INVENTOR(S) : Eric Horvitz and Rric S. Finkelstein It is certified that error appears in the above-identified patent and that said Letters Patent is hereby corrected as shown below:

In column 6, line 52, please delete [CR-ROM] and insert in place thereof -- CD-ROM --

Please change the following text in column 12, lines 40 - 44:

Please delete $\left[ \text{cluster value} = \dfrac{? \, |a_i - a_{i+1}|_1^{k-1}}{k^2} \right]$ and insert in place thereof: -- $\text{cluster value} = \dfrac{\sum_{1}^{k-1} |a_i - a_{i+1}|}{k^2}$ --

UNITED STATES PATENT AND TRADEMARK OFFICE
CERTIFICATE OF CORRECTION

PATENT NO. : 5,864,848
DATED : January 26, 1999
INVENTOR(S) : Eric Horvitz and Eric S. Finkelstein It is certified that error appears in the above-identified patent and that said Letters Patent is hereby corrected as shown below:

Please change the following text in column 22, lines 6 - 12:

Please delete $\left[ \text{cluster value} = \dfrac{\sum_{1}^{k-1} |a_i - a_{i+1}|}{k^2} \right]$ and insert in place thereof: $-- \text{cluster value} = \dfrac{\sum_{1}^{k-1} |a_i - a_{i+1}|}{k^2} \;--$ Signed and Sealed this Thirty-first Day of August, 1999

Attest:

Q. TODD DICKINSON

*Attesting Officer*     *Acting Commissioner of Patents and Trademarks*